(12) United States Patent
Dubey et al.

(10) Patent No.: US 10,853,558 B2
(45) Date of Patent: Dec. 1, 2020

(54) TRANSFORMING DIGITAL TEXT CONTENT USING EXPRESSIONS

(71) Applicant: Adobe Inc., San Jose, CA (US)

(72) Inventors: Rohit Kumar Dubey, Chittorgarh (IN); Anurag Singh, Noida (IN); Aman Arora, New Delhi (IN)

(73) Assignee: Adobe Inc., San Jose, CA (US)

( * ) Notice: Subject to any disclaimer, the term of this patent is extended or adjusted under 35 U.S.C. 154(b) by 59 days.

(21) Appl. No.: 16/280,917

(22) Filed: Feb. 20, 2019

(65) Prior Publication Data

US 2020/0265113 A1 Aug. 20, 2020

(51) Int. Cl.
| | | |
|---|---|---|
| G06F 17/00 | (2019.01) | |
| G06F 40/166 | (2020.01) | |
| G06F 16/35 | (2019.01) | |
| G06F 16/332 | (2019.01) | |
| G06F 40/103 | (2020.01) | |

(52) U.S. Cl.
CPC ........ *G06F 40/166* (2020.01); *G06F 16/3329* (2019.01); *G06F 16/35* (2019.01); *G06F 40/103* (2020.01)

(58) Field of Classification Search
None
See application file for complete search history.

(56) References Cited

U.S. PATENT DOCUMENTS

| | | | |
|---|---|---|---|
| 2002/0129053 A1* | 9/2002 | Chan | G06F 40/18 715/213 |
| 2005/0097514 A1* | 5/2005 | Nuss | G06F 8/427 717/114 |
| 2010/0017397 A1* | 1/2010 | Koyanagi | G06F 16/00 707/E17.017 |
| 2014/0351788 A1* | 11/2014 | Bienkowski | G06F 40/166 717/110 |
| 2018/0321921 A1* | 11/2018 | Venkata | G06F 8/34 |

* cited by examiner

*Primary Examiner* — Mustafa A Amin
(74) *Attorney, Agent, or Firm* — SBMC

(57) ABSTRACT

Techniques for transforming digital text content using expressions are described. According to various implementations, a text editor system determines that digital text content of a digital document is modified via application of a particular style that differs from other digital text content of the digital document. The text editor system identifies a pattern characteristic to the modified digital text content, and generates a digital expression that identifies the pattern, and generates a style expression that combines the digital expression with a digital style that represents style attributes descriptive of the style modification applied to the modified text content. The text editor system applies the style expression to search digital text content, identify matching digital text content that matches the digital expression, and transform the matching digital text content by applying the digital style to modify the matching digital text content.

20 Claims, 27 Drawing Sheets

500

Text Pool 214

Caffeine
collate
conspire
calorie
cycle
Charlie

⬇

Text Analysis Module 216

Text Pattern 218

(1) Some words begin with "c"
(2) Other words begin with "C"
(3) All words end with "e"

⬇

Expression Generator Module 220

Digital Expression 120a

[cC]\w+e

Style Expression 124a

Apply Digital Style 122a to text
[cC]\w+e

Digital Style 122a
- bolded
- italicized

Digital Document 116a

---

Lorem ipsum dolor sit amet, adipiscing elit, sed diam nonummy nibh euismod tincidunt *caffeine* ut laoreet do lore *collate* magna aliquam erat volutpat.

T.orem ipsum *conspire* dolor sit amel, adipiscing elit, sed diam nonummy nibh euismod *calorie* tincidunt ut aoreet dolore magna aliquam *cycle* erat volutpat *Charlie*.

Lorem ipsum dolor sit amet, adipiscing elit. Carve cliam nonummy nibh euismod tincidunt ut laoreet dolore magna aliquam erat chocolate volutpat.

Lorem choice ipsum doJor sit amet, adipiscing elit, sed diam nonwnmy nibh euismod cabbage tincidunt ut laoreet doJore magna ahquam erat volutpat.

126

---

⇩

---

Lorem ipsum dolor sit amet, adipiscing elit, sed diam nonummy nibh euismod tincidunt *caffeine* ut laoreet do lore *collate* magna aliquam erat volutpat.

T.orem ipsum *conspire* dolor sit amel, adipiscing elit, sed diam nonummy nibh euismod *calorie* tincidunt ut aoreet dolore magna aliquam *cycle* erat volutpat *Charlie*.

Lorem ipsum dolor sit amet, adipiscing elit. *Carve* cliam nonummy nibh euismod tincidunt ut laoreet dolore magna aliquam erat *chocolate* volutpat.

Lorem *choice* ipsum doJor sit amet, adipiscing elit, sed diam nonwnmy nibh euismod *cabbage* tincidunt ut laoreet doJore magna ahquam erat volutpat.

126

---

Transformed Digital Document 202

*Fig. 7*

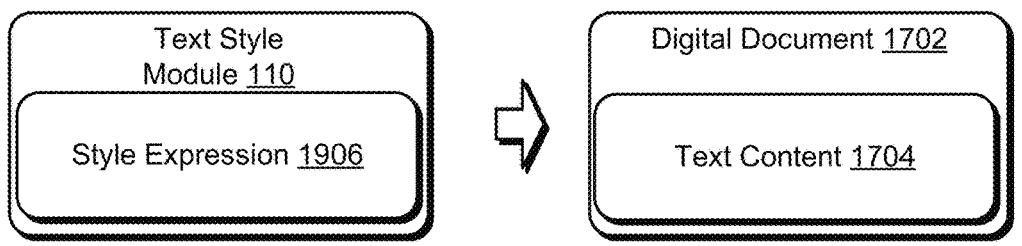
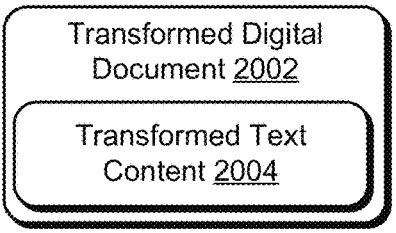
Fig. 20

TRANSFORMING DIGITAL TEXT CONTENT USING EXPRESSIONS

BACKGROUND

A variety of different text editing systems are available that enable users to generate and edit digital text content. Generally, a text editing system can be implemented in various ways, such as a word processing application, a document publishing application, a graphic design application, and so forth. A typical text editing system, for example, enables a user to control numerous different text-related attributes to create customized digital text content. Further, such systems enable digital text content to be edited according to varying levels of granularity, such as from the document level to attributes of individual text characters.

One example way that text editing systems enable digital text content to be edited is by enabling users to specify styles to be applied to digital text content, such as text styles to be applied to digital documents, paragraphs, phrases, words, and/or individual text characters. Examples of different style-related attributes that can be customized in digital text content include font, text size, text coloring, character spacing, paragraph attributes (e.g., tabs, indents, and spacing), and so forth. A user, for instance, can leverage a text editing system to create a document with digital text content and to specify varying styles for different portions of the digital text content to generate a customized text experience.

Conventional text editing systems, however, are limited in the ways in which they enable users to edit text styles. For instance, to apply a particular style attribute to digital text in a conventional text editing system, a user can manually search through a document, select the desired digital text, and specify a style to be applied to the selected digital text. To attempt to expedite this process, a user may leverage an automated search function to search through the document to automatically identify a specified portion of digital text, at which point the user may specify a particular text style to apply to the identified digital text. Such wholly or partially manual processes for applying styles to digital text, however, are extremely inefficient both in terms of user and system resources.

For instance, consider a scenario involving a large document with many pages of digital text, such as hundreds or thousands of pages. If a user wishes to utilize a conventional text editing system to apply a custom style to a particular set of digital text that recurs throughout the document, the user will typically have to search through the document (manually or utilizing an automated search) and manually specify the custom style for each instance of the set of digital text. At the very least, this will require a considerable time expenditure on the user's part. Worse still, the user may become frustrated and/or run out of time, and abandon the text editing task, resulting in a less than optimal version of the document.

In addition to requiring considerable human resources, such conventional processes consume excessive system resources as well. For instance, processor and memory resources that would otherwise be available for other computing tasks may be relegated to the repetitive task of responding to user input while the user is manually searching and applying a custom style to the desired digital text content, thus causing these resources to be less available or unavailable for other computing tasks. Thus, techniques utilized by conventional text editing systems for applying styles to digital text content are inefficient both from a user workflow perspective, and from a system resources perspective.

SUMMARY

To overcome these problems, techniques for transforming digital text content using expressions are delivered in a digital medium environment. Generally, a text editor system determines that digital text content of a digital document is modified via application of a particular style that differs from other digital text content of the digital document. The text editor system automatically detects the modified digital text content and identifies a pattern characteristic to the modified digital text content, and searches the digital document to determine if other digital text content that is not modified matches the pattern. In response to identifying other digital text content that matches the pattern and that is not modified, the text editor system generates a digital expression that identifies a pattern characteristic of the modified text content, and generates a style expression that combines the digital expression with a digital style that represents style attributes descriptive of the style modification applied to the modified text content. The text editor system applies the style expression to search digital text content, identify matching digital text content that matches the digital expression, and transform the matching digital text content by applying the digital style to modify the matching digital text content. According to various implementations, this process can be performed automatically and independent of user input after the initial modification of the digital text content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 5 depicts an example implementation scenario for generating a style expression as part of a style expression process.

FIG. 7 depicts an example implementation scenario for showing visual changes caused by application of a style expression.

FIG. 20 depicts an example implementation scenario for applying a style expression to modify text content.

DETAILED DESCRIPTION

Overview

Figure 1:
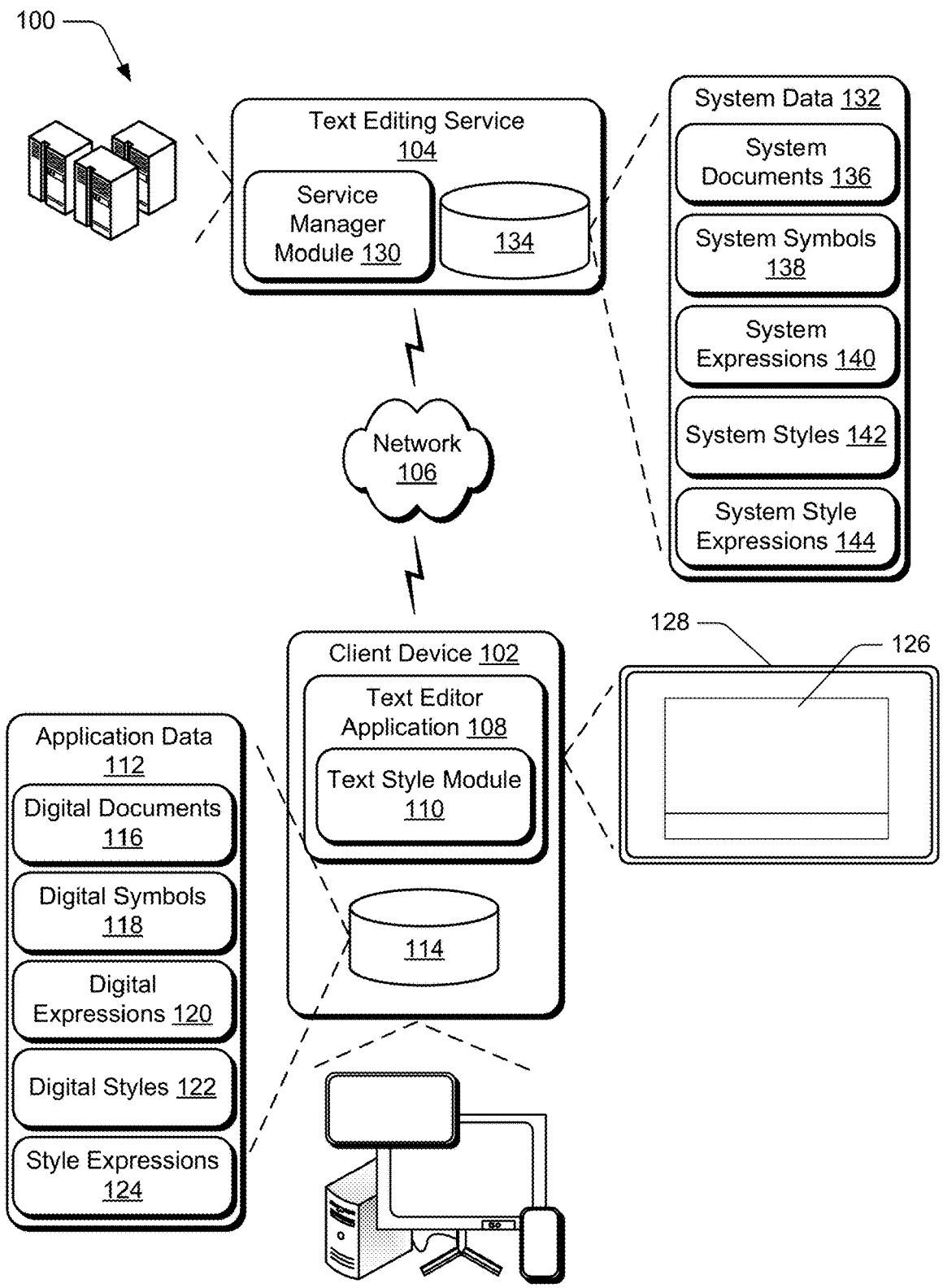
FIG. 1 is an illustration of an environment in an example implementation that is operable to employ techniques described herein.

Conventional text editing systems that provide text editing functionality typically enable a user to select text content and manually specify a style to be applied to the text content. These conventional systems, however, are labor intensive and require significant user assistance to identify text to be modified, and to specify styles to be used to modify text content. To attempt to reduce a number of user interactions required to customize styles of text content, user's that interact with text editor systems may use an automated text search functionality to identify different instances of text content, and to apply a text to the identified text content. However, conventional text search functionalities require a user to manually identify a text content to be located, and to manually specify a style to be applied to the text content. Further, such search functionalities are typically limited to locating identical instances of text content, and do not provide the ability to locate different instances of text content that match a particular pattern but that are not identical. Thus, conventional text editing systems are burdensome on user and system resources by requiring extensive user interaction to locate and edit text content, and by preventing system resources (e.g., processor and memory bandwidth) allocated to the manual processes from being available for other system tasks.

To overcome these drawbacks with conventional text editing systems, techniques for transforming digital text content using expressions are implemented in a digital medium environment. For instance, a text editor system determines that digital text content of a digital document is modified via application of a particular style that differs from other digital text content of the digital document. A user, for example, selects instances of digital text content (e.g., words, phrases, text strings, and so forth) from the digital document, and specifies a style modification to be applied to the instances of digital text content. This causes the selected digital text content to be styled differently than other digital text content in the digital document. The text editor system automatically detects the modified digital text content and identifies a pattern characteristic to the modified digital text content, and searches the digital document to determine if other digital text content that is not modified matches the pattern.

In response to identifying other digital text content that matches the pattern and that is not modified, the text editor system presents a query dialog that queries whether the user would like to apply a style expression to modify the other digital text content. Based on user acceptance of the query dialog, the text editor system generates a digital expression that identifies a pattern characteristic of the modified text content. The digital expression is generated by aggregating digital symbols that are each indicative of different conditions pertaining to the modified digital text content. The digital symbols, for instance, are metacharacters that represent the various conditions descriptive of the modified digital text content. In at least one implementation, the digital symbols are implemented as GREP (Globally search a Regular Expression and Print) metacharacters that can be used to generated regular expressions according to the GREP protocol.

Further to techniques described herein, the text editor system then generates a style expression that combines the digital expression with a digital style that represents style attributes descriptive of the style modification applied to the modified text content. The text editor system applies the style expression to search digital text content, identify matching digital text content that matches the digital expression, and transform the matching digital text content by applying the digital style to modify the matching digital text content. According to various implementations, this process can be performed automatically and independent of user input after the initial modification of the digital text content.

In this way, techniques for transforming digital text content using expressions provide automated processes for transforming digital text content. By automatically identifying modified digital text content and generating style expressions that can be used to transform other digital text content, the disclosed techniques greatly reduce the number of user interactions and system resources required to transform digital text content in comparison with conventional text editing systems. Thus, a more efficient text editor experience is provided that conserves system resources as well as user time and interaction required to edit text content.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques for transforming digital text content using expressions described herein. The illustrated environment 100 includes a client device 102 and a text editing service system ("text editing service") 104 that are communicatively coupled, one to another, via a network 106.

Computing devices that are usable to implement the client device 102 and the text editing service 104 may be configured in a variety of ways, such as a desktop computer, a laptop computer, a mobile device (e.g., assuming a handheld configuration such as a tablet or mobile phone), a server device, and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 27.

The client device 102 includes a text editor application 108 that is representative of functionality to perform various editing interactions with digital text, such as for generating and revising digital text content. The text editor application 108, for instance, includes a text style module 110 that is representative of functionality to enable a user to apply text styles to digital text content according to techniques for transforming digital text content using expressions described herein.

To enable the text style module 110 to apply text styles to digital text content, the text editor application 108 maintains application data 112 stored on a local storage 114. The application data 112 includes digital documents 116, which are representative of different electronically-stored collections of digital media content. Generally, the digital documents 116 include digital text content, and may include other types of digital media, such as digital images, digital video, digital audio, metadata, and so forth. The application data 112 further includes digital symbols 118, digital expressions 120, digital styles 122, and style expressions 124. The digital symbols 118 are representative of character symbols that can be leveraged by the text style module 110 to generate different instances of the digital expressions 120. The digital expressions 120, for instance, are generated by aggregating (e.g., concatenating) different instances of the digital symbols 118.

Generally, the digital expressions 120 are usable by the text style module 110 to describe patterns in digital text, such as digital text characters, digital text styles, conditions pertaining to digital text, and so forth. In at least one implementation, the digital expressions 120 can be implemented as GREP (Globally search a Regular Expression and Print) expressions generated using digital symbols 118. The digital styles 122 represent different style attributes that can be applied to digital text of the digital documents 116. Examples of the digital styles 122 include different fonts, text size, text coloring, character spacing, paragraph attributes (e.g., tabs, indents, and spacing), and so forth, that can be applied to digital text of the digital documents 116.

The style expressions 124 generally represent combinations of the digital expressions 120 and the digital styles 122. For instance, the text style module 110 can generate a particular digital expression 120 that describes a particular text pattern, and can define a particular digital style 122. The text style module 110 can then generate a particular style expression 124 using the particular digital expression 120 and the particular digital style 122 such that when the style expression 124 is applied to a digital document 116, text content of the digital document 116 that matches the particular digital expression 120 is modified to reflect the particular digital style 122.

To enable users to interact with the text editor application 108, such as to cause different style expressions 124 to be applied to the digital documents 116, the text editor application 108 includes a text editor graphical user interface ("GUI") 126 displayed on display device 128 of the client device 102. The text editor GUI 126 is representative of functionality to present various visual affordances for interacting with the text editor application 108. The text editor GUI 126, for example, is configured to receive user input to invoke various actions by the text editor application 108. For instance, a user may provide input to the text editor GUI 126 to cause a style expression 124 to be generated that describes a certain pattern in text content and a certain digital style 122. The text style module 110 can utilize the generated style expression 124 to search and identify text content in the digital documents 116 to which the digital style 122 is applied.

In at least some implementations, certain text editing actions of the text editor application 108 can be performed in part or wholly by the text editing service 104. The text editing service 104, for example, represents a network-based service that can assist the client device 102 in performing various text editing actions via the text editor application 108. To enable the text editing service 104 to perform such actions, the text editing service 104 maintains a service manager module 130, which is representative of functionality for performing actions as part of techniques for transforming digital text content using expressions described herein. Examples of such actions include different data processing and storage tasks that can be performed by the text editing service 104.

For instance, additionally or alternatively to storing the application data 112 locally on the client device 102, the text editing service 104 stores system data 132 on a system storage 134. The system data 132 includes system digital documents ("system documents") 136, system digital symbols ("system symbols") 138, system digital expressions ("system expressions") 140, system digital styles ("system styles") 142, and system style expressions 144. A user, for example, can access the text editing service 104 via the text editor application 108 on the client device 102 to enable the user to edit digital documents via the text editing service 104. Thus, digital documents may be edited locally on the client device 102, via interaction with the text editing service 104, and/or cooperatively via distribution of tasks between the client device 102 and the text editing service 104. Thus, although certain implementations are discussed herein with reference to instances of the digital documents 116, the digital symbols 118, the digital expressions 120, and the digital styles 122, such implementations may additionally or alternatively apply to the system documents 136, the system symbols 138, the system expressions 140, the system styles 142, and the system style expressions 144, respectively.

Having considered an example environment, consider now a discussion of some example details of the techniques for transforming digital text content using expressions in accordance with one or more implementations.

Transforming Digital Text Content Using Expressions

Figure 2:
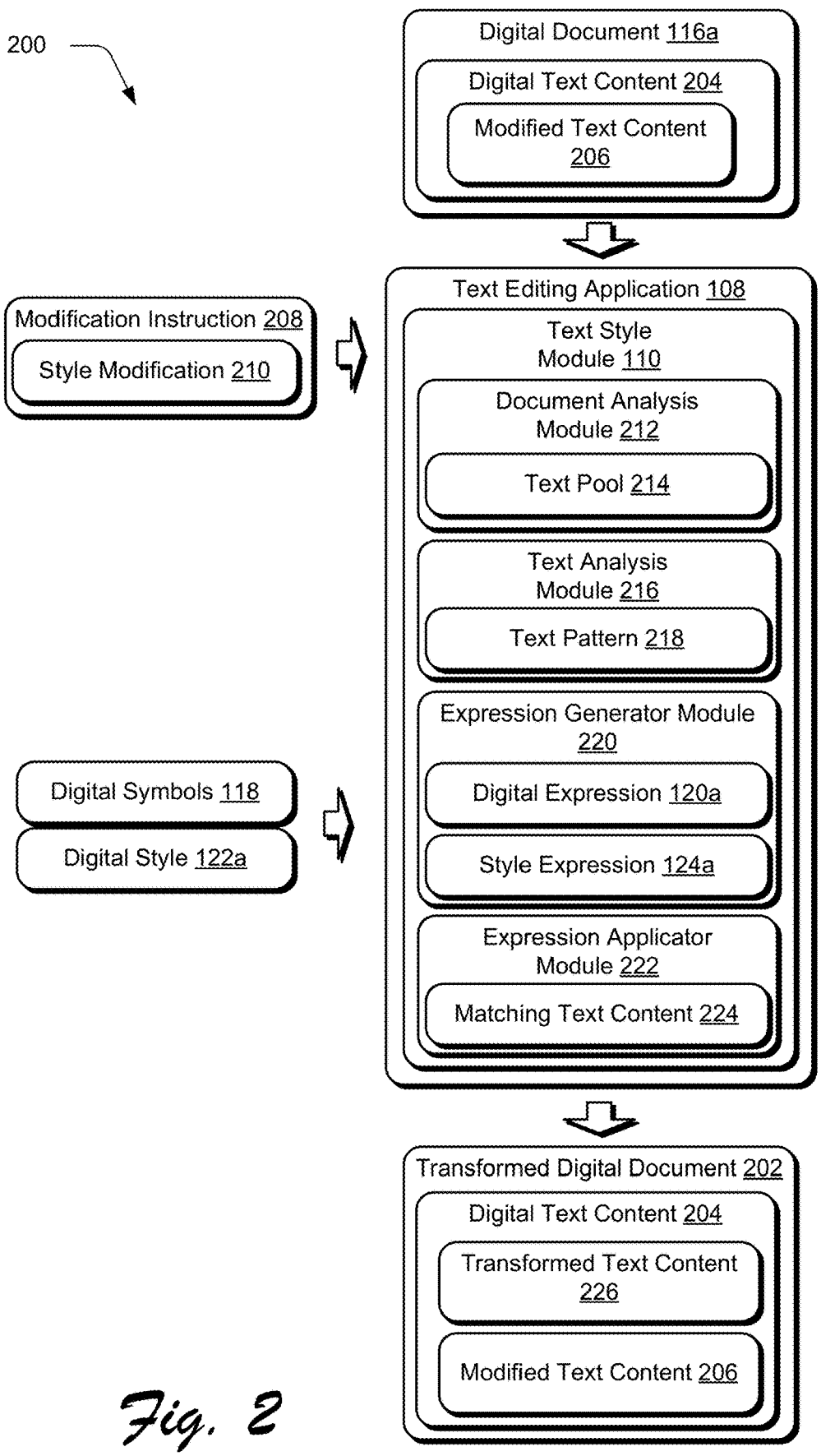
FIG. 2 depicts an example implementation in which a text editor system transforms a digital document using a style expression.

FIG. 2 depicts portions of a text editor system 200 in an example implementation in which the text editor application 108 modifies a digital document 116a to generate a transformed digital document 202 utilizing techniques for transforming digital text content using expressions described herein. In the system 200, the text editor application 108 determines that a digital document 116a with digital text content 204 includes modified text content 206. Generally, the modified text content 206 represents text content that has a different style than other text of the digital text content 204.

In at least one implementation, the modified text content 206 is modified in response to a modification instruction 208 to apply a style modification 210 to portions of the digital text content 204 to generate the modified text content 206. The modification instruction 208, for instance, is based on user input specifying the style modification 210 to be applied to portions of the digital text content 204. The user input, for example, selects a portion of the digital text content 204 from the digital document 116a, such as individual text characters, words, phrases, and so forth. The modification instruction 208 further identifies a particular type of style modification 210 to be applied to the selected portion of the digital text content 204, such as a change in text characteristics such as font, color, size, and/or other text characteristic. Alternatively or additionally, the style modification 210 can represent a modification at a paragraph and/or section level, such as spacing, tab settings, alignment, and so forth. As an alternative or addition to user input, the modification instruction 208 can be generated automatically, such as via a machine-initiated instruction generated by the text editor application 108 and independent of user input.

Continuing, the text style module 110 leverages a document analysis module 212 to aggregate a text pool 214 that represents portions of text from the modified text content 206. The text pool 214, for instance, includes a group of individual words and/or phrases of the digital text content 204 to which the style modification 210 is applied to generate the modified text content 206. A text analysis module 216 then analyzes the text (e.g., words and/or phrases) in the text pool 214 to identify a text pattern 218 associated with the modified text content 206. Generally, the text pattern 218 represents a condition or set of conditions that is characteristic of the modified text content 206. Examples of the text pattern 218 exhibited by the modified text content 206 include a sequence of text characters, an arrangement of text characters, a reoccurrence of particular text characters, a position of particular text characters within the modified text content 206, and so forth.

The text style module 110 further includes an expression generator module 220, which is representative of functionality to generate the digital expressions 120 and the style expressions 124. Accordingly, the expression generator module 220 utilizes a set of the digital symbols 118 to generate a digital expression 120a that describes the text pattern 218. Example ways of generating digital expressions 120 are detailed below. The expression generator module 220 then associates a digital style 122a with the digital expression 120a to generate a style expression 124a. The digital style 122a, for instance, corresponds to a particular text style identified by the style modification 210. Generally, the style expression 124a represents a set of data that is usable by the text style module 110 to modify portions of the digital text content 204 to generate the transformed digital document 202.

Accordingly, an expression applicator module 222 utilizes the style expression 124a to parse the digital text content 204 of the digital document 116a and to identify matching text content 224 that matches the text pattern 218 as described by the digital expression 120a. The matching text content 224, for instance, represents portions of the digital text content 204 that are not part of the modified text content 206 of the initial digital document 116a, and that match the text pattern 218. The expression applicator module 222 then applies the digital style 122a to the matching text content 224 to generate transformed text content 226. The transformed text content 226 generally represents the matching text content 224 as modified by applying the digital style 122a to reformat the matching text content 224 into the transformed text content 226. Thus, the digital document 116a is modified to generate the transformed digital document 202 by reformatting the matching text content 224 to generate the transformed text content 226. The digital text content 204 in the transformed digital document 202 thus includes the modified text content 206 of the original digital document 116a, as well as portions of the digital text content 204 that are modified by application of the style expression 124a to generate the transformed text content 226.

Thus, as depicted in the system 200, techniques for transforming digital text content using expressions can be employed to automatically identify and transform text content based on text-related patterns and style modifications.

Figure 3:
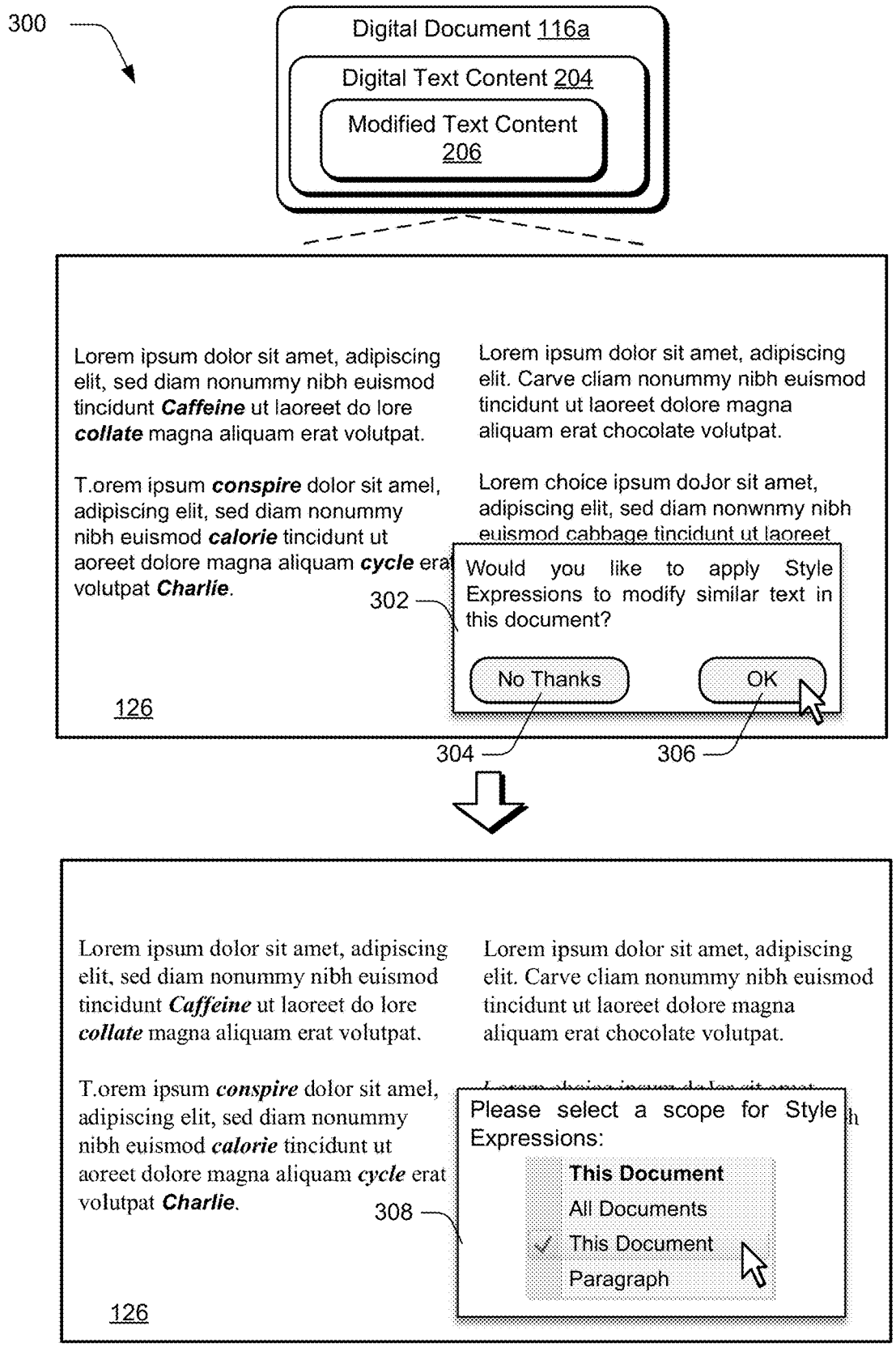
FIG. 3 depicts an example implementation scenario for initiating a style expression process.

FIGS. 3-7 depict an example scenario for implementing aspects of transforming digital text content using expressions. FIG. 3 depicts a scenario 300 for initiating a style expression process. In the scenario 300, the digital document 116a is displayed in the text editor GUI 126 and the text style module 110 determines that style expressions can be applied to the digital document 116a, such as to automatically format portions of the digital text content 204. As mentioned above, for example, the text editor application 108 detects that a user modifies some of the digital text content 204 to generate the modified text content 206, and/or the text editor application 108 analyzes the digital document 116a to detect the modified text content 206. In this particular example, the modified text content 206 includes some text that is bolded and italicized, e.g., "Caffeine," "collate," "conspire," "calorie," "cycle," and "Charlie."

In response to detecting the modified text content 206, the text style module 110 determines that a style expression 124 can be applied to automatically style other digital text content 204 similarly to the modified text content 206. Accordingly, the text editor application 108 presents a style query dialog 302 which indicates that style expressions can be applied to modify portions of the digital text content 204, and queries whether the user would like to apply style expressions to the digital document 116a. The style query dialog 302 further includes a decline control 304 that is selectable to indicate that a style expression is not to be applied, and an accept control 306 that is selectable to initiate a style expression process for applying a style expression 124 to the digital document 116a.

Further to the scenario 300, a user selects the accept control 306, and in response, the text style module 110 presents a scope query dialog 308 which queries the user to select a scope for the style query process. In this particular example, the scope query dialog 308 includes three different scope options, "All Documents," "This Document," and "Paragraph." The "All Documents" scope, for instance, is selectable to cause a style expression to be applied to a group of different digital documents 116, such as a group of digital documents 116 stored in a particular folder or other storage location. The "This Document" scope is selectable to cause a style expression to be applied to the text content 204 of the digital document 116a. For instance, selecting the "This Document" scope causes a style expression 124 to be generated and applied to process the text content 204, but not to other digital documents 116 outside of the digital document 116a. The "Paragraph" scope is selectable to cause a style expression to be applied to a single paragraph or set of paragraphs of the digital document 116a. For instance, if a single paragraph or set of paragraphs is selected and/or in focus, selecting the "Paragraph" option causes a style expression 124 to applied to the paragraph(s).

Continuing, the user selects the "This Document" scope option from the scope query dialog 308, and the text style module 110 proceeds to process the digital document 116a to generate and apply a style expression 124, as described in the following.

Figure 4:
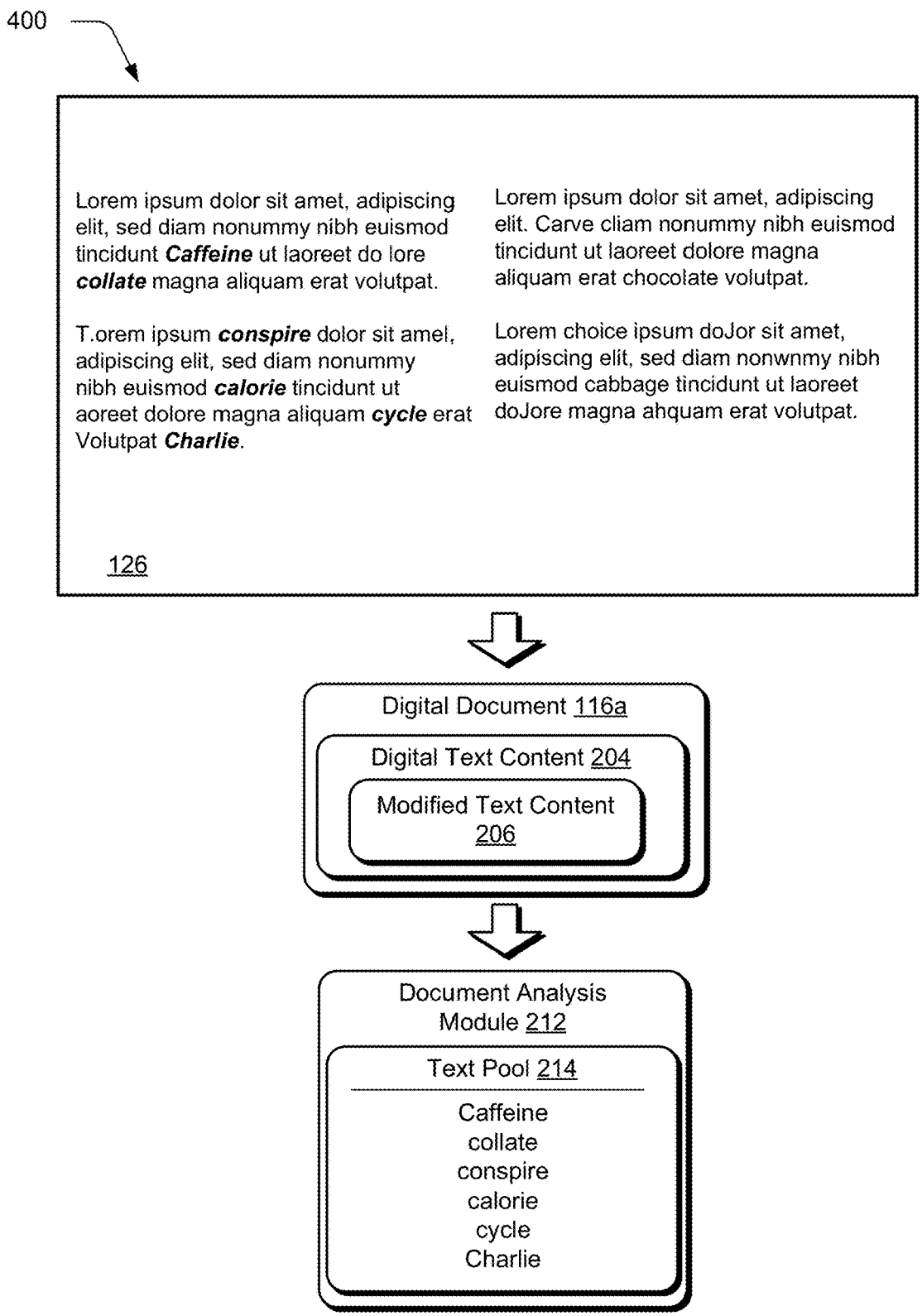
FIG. 4 depicts an example implementation scenario for compiling a text pool as part of a style expression process.

FIG. 4 depicts a scenario 400 for compiling a text pool as part of a style expression process. The scenario 400, for instance, represents a continuation of the scenario 300, above. For example, in response to initiating a style expression process for the digital document 116a, the document analysis module 212 generates the text pool 214, which includes the modified text content 206. The document analysis module 212, for example, analyzes the digital document 116a to identify text content that has a same or similar character style and/or style override applied. In this particular example, the document analysis module 212 determines that words of the modified text content 206 are formatted differently than the surrounding digital text content 204, i.e., are bolded and italicized while the surrounding digital text content 204 is not. Thus, the document analysis module 212 populates the modified text content 206 to the text pool 214.

FIG. 5 depicts a scenario 500 for generating a style expression as part of a style expression process. The scenario 500, for instance, represents a continuation of the scenarios 300, 400, above. In the scenario 500, the text analysis module 216 analyzes the text pool 214 to identify the text pattern 218 common to the individual words in the text pool 214. In this particular example, the text pattern 218 indicates that with regard to the text pool 214, (1) Some words begin with "c" (lowercase "c"), (2) other words begin with "C" (uppercase "C"), and (3) all words end with "e."

Accordingly, the expression generator module 220 processes the text pattern 218 to generate the digital expression 120a, which includes a set of digital symbols 118 that describe the text pattern 218. In this particular scenario, the digital expression 120a is generated as "[cC]\w+e" to describe the text pattern 218. For instance, the portion of the digital expression 120a "[cC]" represents the text state of words that begin with either lowercase "c" or uppercase "C." Further, the portion of the digital expression 120a "\w+e" represents the text state of words that end with lowercase "e." More detailed examples of how digital expressions 120 can be generated are presented below.

Continuing with the scenario 500, the expression generator module 220 generates the style expression 124a utilizing the digital style 122a and the digital expression 120a. The style expression 124a, for instance, represents machine instructions specifying that the digital style 122a (e.g., bold/italicized) is to be applied to text identified by the digital expression 120a.

Figure 6:
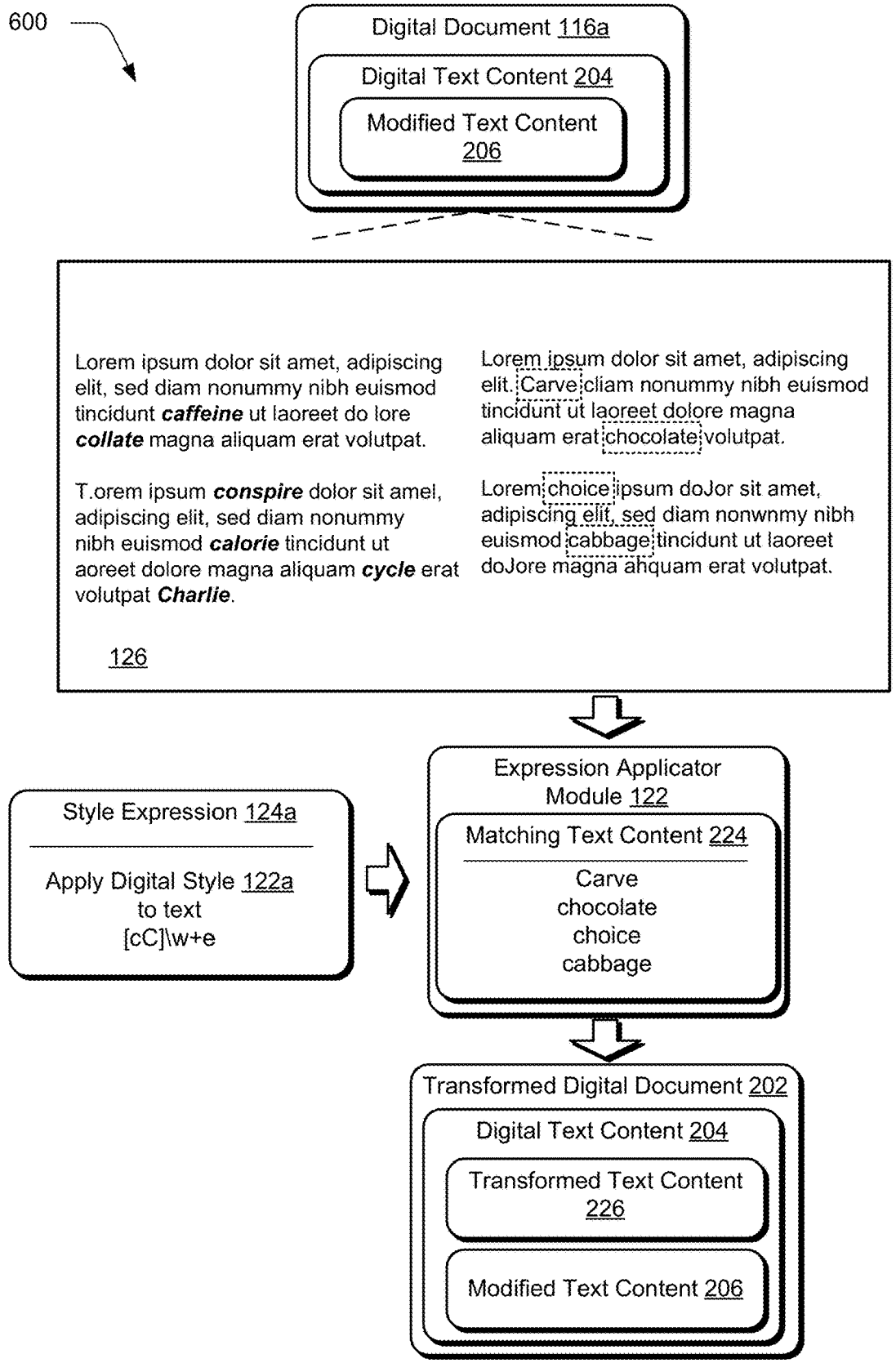
FIG. 6 depicts an example implementation scenario for applying a style expression as part of a style expression process.

FIG. 6 depicts a scenario 600 for applying a style expression as part of a style expression process. The scenario 600, for instance, represents a continuation of the scenarios 300-500, above. In the scenario 600, the expression applicator module 222 utilizes the style expression 124a to process the digital document 116a and to generate the transformed digital document 202. For instance, the expression applicator module 222 analyzes the digital text content 204 using the digital expression 120a to identify the matching text content 224 described by the digital expression 120a. In this particular example, the matching text content 224 includes the text "Carve," "chocolate," "choice," and "cabbage," which represent words identified by the digital expression "[cC]\w+e" described above.

The expression applicator module 222 then applies the digital style 122a to the matching text content 224 to generate the transformed text content 226. The expression applicator module 222, for instance, reformats the matching text content 224 using the digital style 122a, e.g., by bolding and italicizing the matching text content 224 to generate the transformed text content 226. Thus, the transformed digital document 202 represents the digital document 116a modified by applying the digital style 122a to generate the transformed text content 226.

FIG. 7 depicts a scenario 700 showing visual changes caused by application of a style expression. The scenario 700, for instance, represents a continuation of the scenarios 300-600, above. The upper portion of the scenario 700 shows a portion of the digital document 116a displayed in the text editor GUI 126 prior to the text style module 110 performing a style expression process to transform the digital document 116a. The lower portion of the scenario 700 shows a portion of the transformed digital document 202 displayed in the text editor GUI 126 after the style expression process is applied, e.g., with the transformed text content 226. As shown, the transformed text content 226 represents the matching text content 226 with the digital style 122a applied, e.g., bold italics. This particular digital style is shown for purpose of example only, and it is to be appreciated that a wide variety of different style modifications can be applied according to techniques for transforming digital text content using expressions.

FIGS. 8-13 depict an example implementation scenario for transforming digital text content using expressions in which multiple style expression options are generated. Portions of this scenario are described with reference to operations performed by the text style module 110, but as described above, the text style module 110 includes various modules that are operable to perform the various operations.

Figure 8:
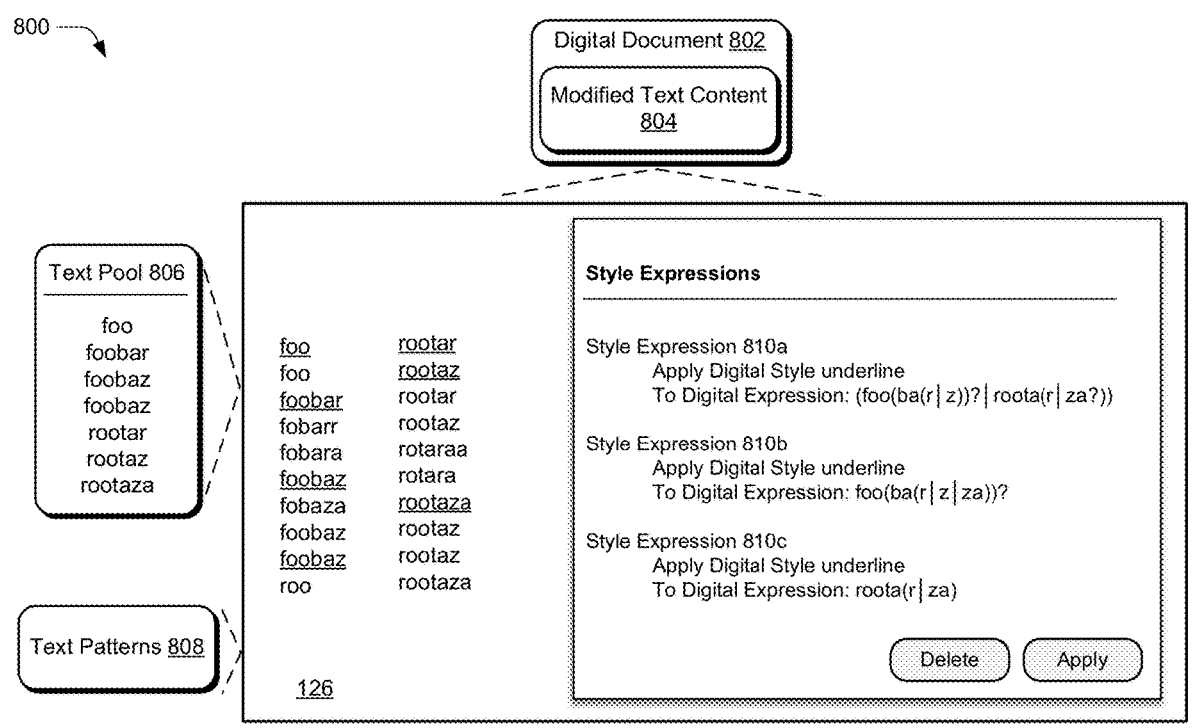
FIG. 8 depicts an example implementation scenario in which text content of a digital document is modified to generate modified text content.

FIG. 8 depicts an implementation scenario 800 in which text content of a digital document 802 is modified to generate modified text content 804. A user, for instance, selects text content from the digital document and applies a particular modification to the selected text content. In this particular example, the modified text content 804 is modified by applying underlining to certain portions of the text content.

Accordingly, the text style module 110 generates a text pool 806 that includes the modified text content 804, determines text patterns 808 that describe the text content in the text pool 806, and generates multiple style expressions 810a, 810b, and 810c that each describe different text patterns 808. As illustrated, each of the style expressions 810a, 810b, 810c includes a different digital expression that each describes a different text pattern 808 exhibited in the text pool 806.

Figure 9:
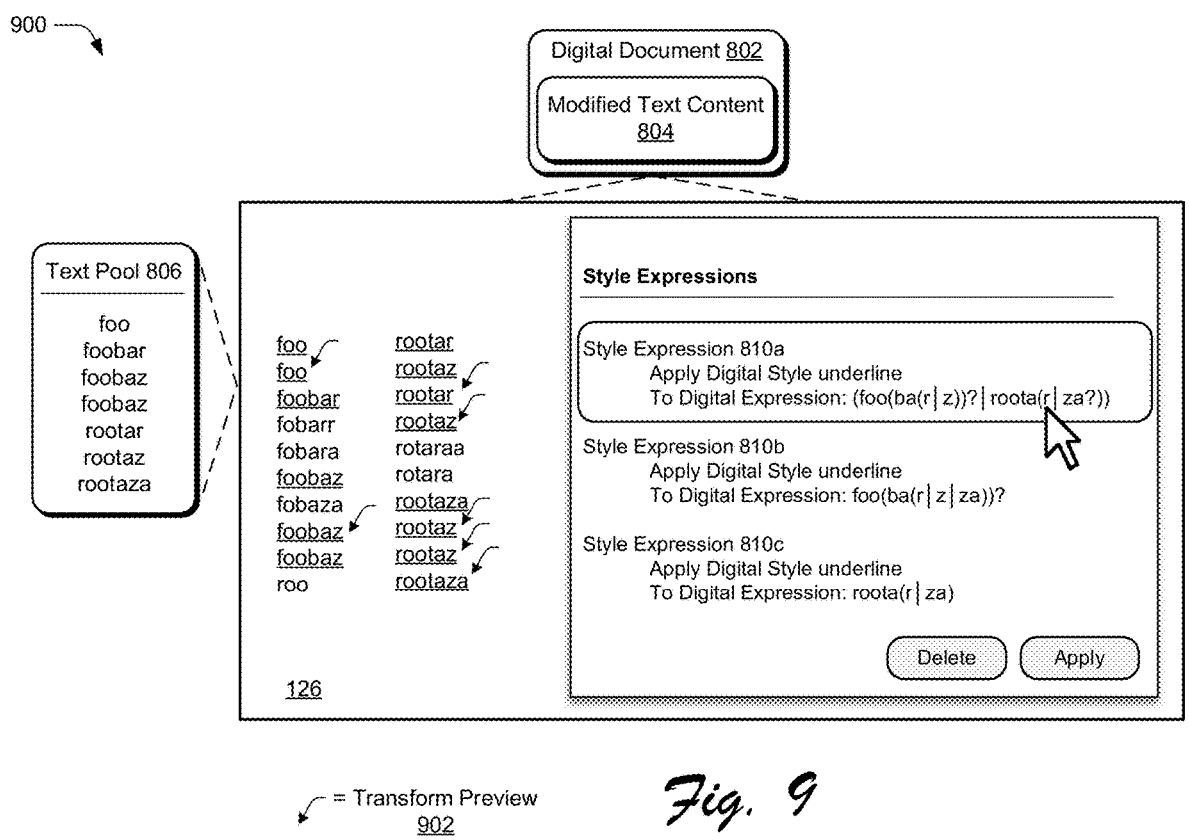
FIG. 9 depicts an example implementation scenario in which a selected style expression is applied to text of a digital document to generate a preview of transformed digital text content.

FIG. 9 depicts an implementation scenario 900 in which a selected style expression is applied to text of a digital document to generate a preview of transformed digital text content. The scenario 900, for instance, represents a continuation of the scenario 800, above. In the scenario 900, a user selects the style expression 810a, which causes the text style module 110 to apply a digital style to text content of the digital document 802 identified by the digital expression 810a to generate a transform preview 902. Generally, the transform preview 902 represents portions of digital text content that are transformed by applying underlining to the text content identified by the style expression 810a. The arrows pointing to the transform preview 902 are included for purposes of this disclosure to identify the individual portions (e.g., words) of the transform preview 902, and would not typically be displayed in an actual implementation. In at least one implementation, the transform preview 902 represents a preview of the visual effect of applying the style expression 810a, and does not represent a permanent transformation of the digital document 802.

Figure 10:
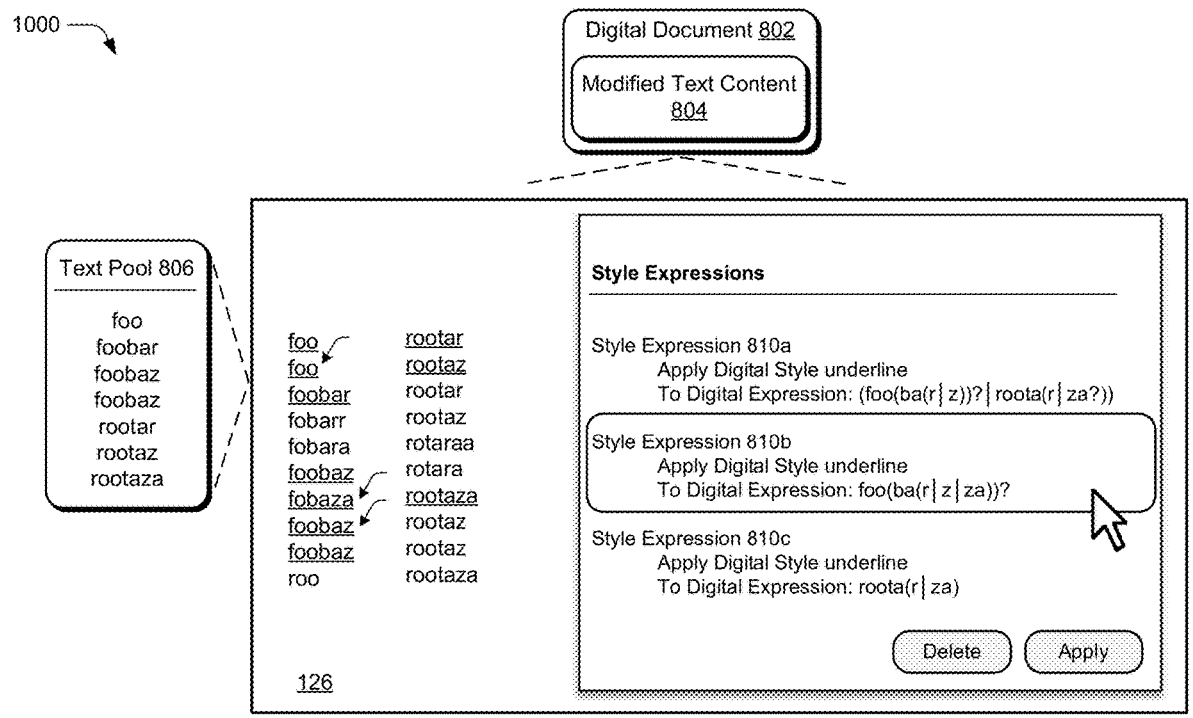
FIG. 10 depicts an example implementation scenario in which a selected style expression is applied to text of a digital document to generate a preview of transformed digital text content.

FIG. 10 depicts an implementation scenario 1000 in which a selected style expression is applied to text of the digital document 802 to generate a preview of transformed text content. The scenario 1000, for instance, represents a continuation of the scenarios 800, 900, above. In the scenario 1000, a user selects the style expression 810b, which causes the text style module 110 to apply a digital style to text content of the digital document 802 identified by the digital expression 810b to generate a transform preview 1002. As depicted, the transform preview 1002 transforms a different portion of digital text content than does the transform preview 902 depicted in FIG. 9.

Figure 11:
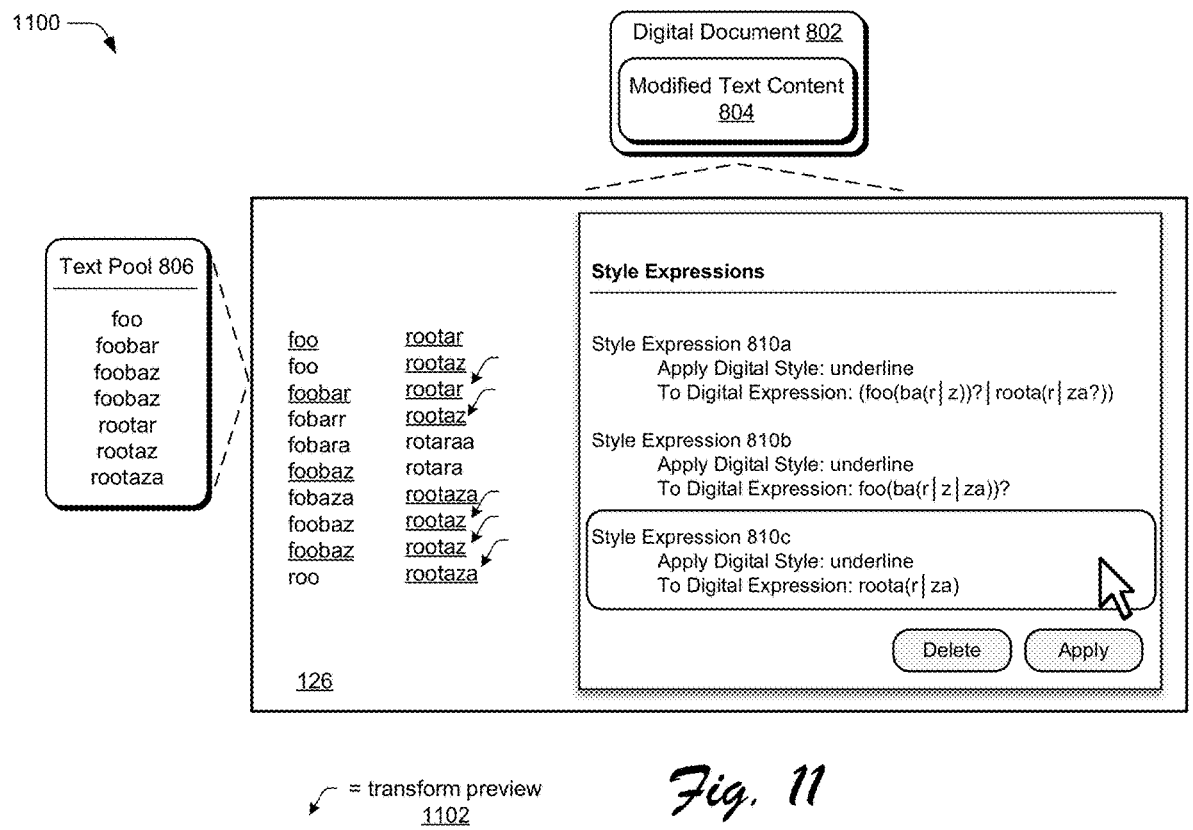
FIG. 11 depicts an example implementation scenario in which a selected style expression is applied to text of a digital document to generate a preview of transformed digital text content.

FIG. 11 depicts an implementation scenario 1100 in which a selected style expression is applied to text of the digital document 802 to generate a preview of transformed text content. The scenario 1100, for instance, represents a continuation of the scenarios 800-1000, above. In the scenario 1100, a user selects the style expression 810c, which causes the text style module 110 to apply a digital style to text content of the digital document 802 identified by the digital expression 810c to generate a transform preview 1102. As depicted, the transform preview 1102 transforms a different portion of digital text content than does the transform previews depicted in FIGS. 9 and 10.

Thus, as illustrated by the scenarios 900-1100, different style expressions can be generated based on a particular text pool, and each of the style expressions can be individually selectable to view an effect of the style expressions being applied to text content of a digital document.

Figure 12:
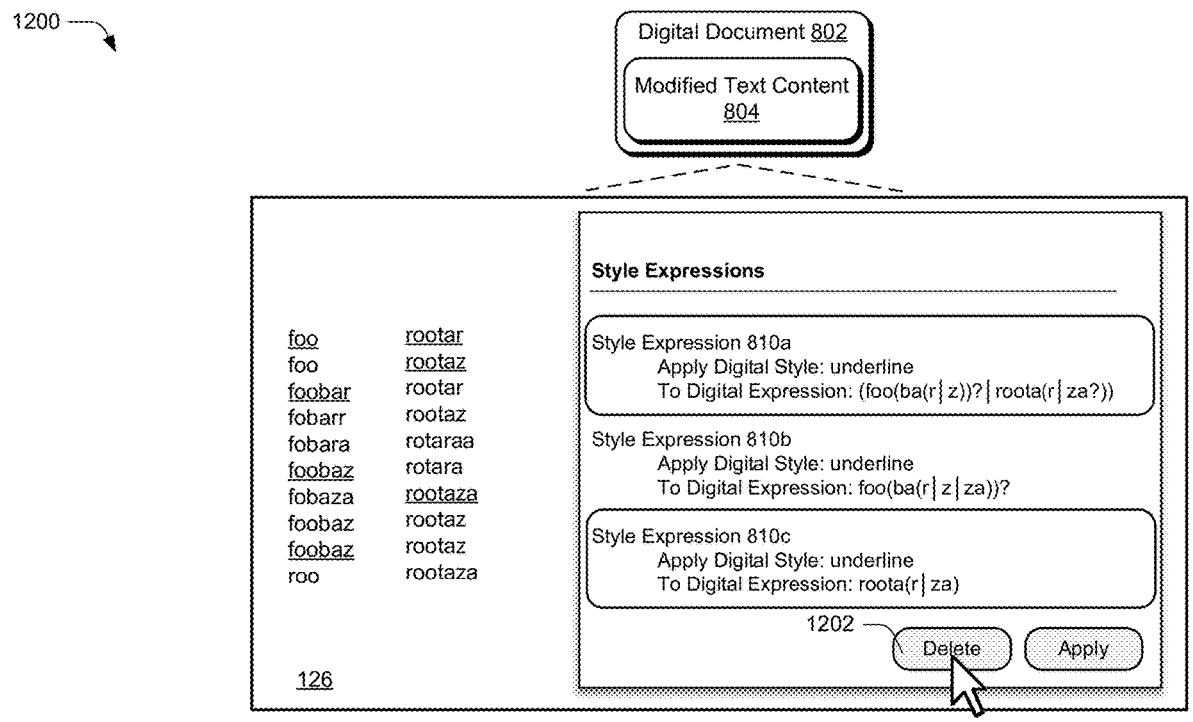
FIG. 12 depicts an example implementation scenario in which available style expressions are removed to enable a desired style expression to be applied.

FIG. 12 depicts an implementation scenario 1200 in which available style expressions are removed to enable a desired style expression to be applied. The scenario 1200, for instance, represents a continuation of the scenarios 800-1100, above. In the scenario 1200, a user selects the style expressions 810a, 810c. The user then selects a delete control 1202, which causes the style expressions 810a, 810c to be removed from the style expressions available to transform the digital document 802.

Figure 13:
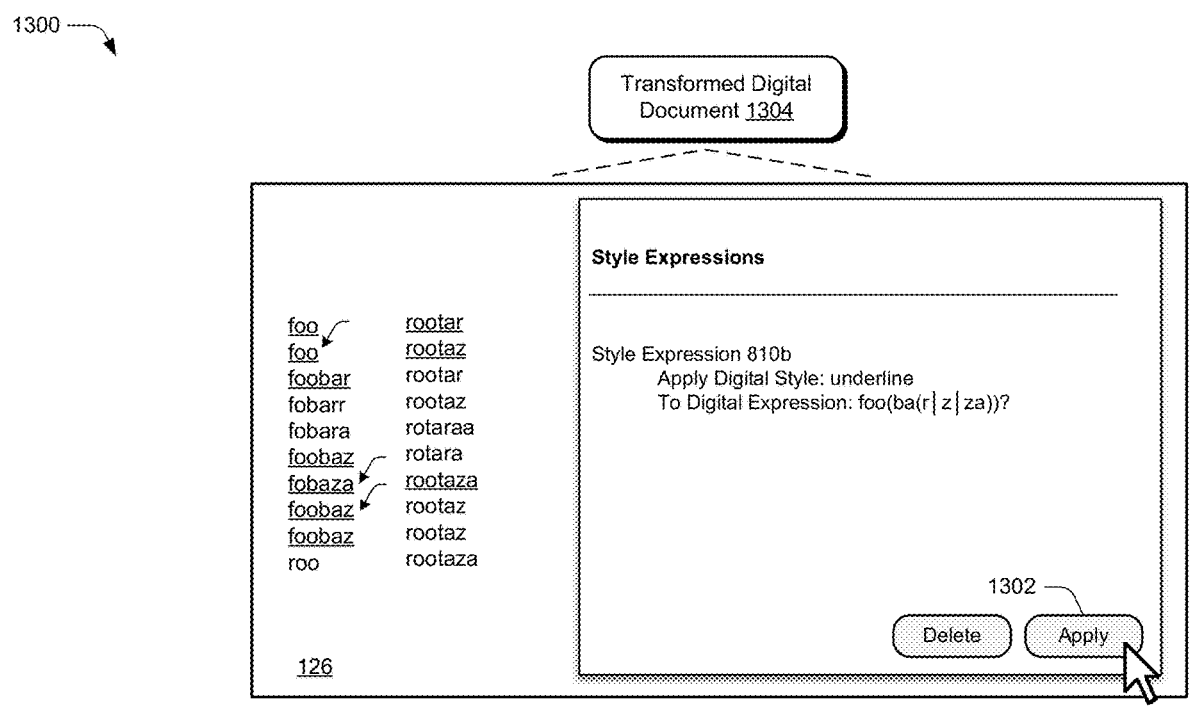
FIG. 13 depicts an example implementation scenario in which an available style expression is applied to transform a digital document.

FIG. 13 depicts an implementation scenario 1300 in which an available style expression is applied to transform a digital document. The scenario 1300, for instance, represents a continuation of the scenarios 800-1200, above. In the scenario 1300, the style expressions 810a, 810c have been removed from the text editor GUI 126, such as described above in the scenario 1200. Further, the style expression 810b remains available. Accordingly, a user selects an apply control 1302, which causes the style expression 810b to be applied to generate a transformed digital document 1304 that includes transformed text content 1306 that is transformed according to the style expression 810b. In at least one implementation, selecting the apply control 1302 causes the transformed text content 1306 to be generated and the transformed digital document 1304 to be stored in memory and/or other data storage location.

Accordingly, the scenarios 800-1300 illustrate that different instances of style expressions can be generated and previewed before selecting a particular style expression to be applied for transforming text content of a digital document.

Figure 14:
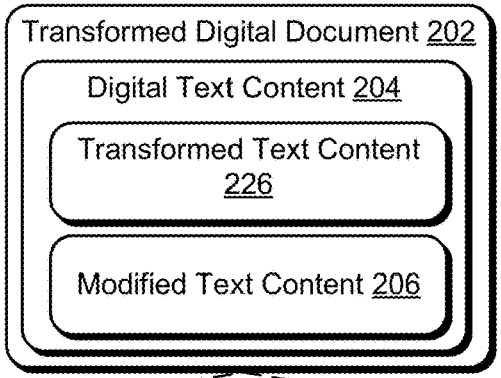
FIG. 14 depicts an example implementation scenario for dynamic application of a style expression.

FIG. 14 depicts an implementation scenario 1400 for dynamic application of a style expression. The scenario 1400, for instance, represents a continuation of the scenarios 300-700, described above. The scenario 1400 includes the transformed digital document 202 with the transformed text content 226 that was transformed as described previously. After the transformed text content 226 is generated as described above, a user adds additional text content 1402 to the transformed digital document 202. Generally, the additional text content 1402 may be added in various ways, such as via keyboard input of individual text characters, voice recognition of audible user input, digital ink input, pasting the additional text content 1402 from a different digital document, and so forth.

In response to detecting the additional text content 1402, the expression applicator module 222 detects additional matching text 1404 that matches the style expression 124a. Accordingly, the style applicator module 222 applies the style expression 124a to transform the additional matching text 222 based on the digital style specified by the style expression 124a. In this particular example, the expression applicator module 222 applies the style expression 124a to transform the additional matching text 1404 from standard text formatting to bolded/italicized text as specified by the style expression 124a. The additional matching text 1404, for instance, is transformed dynamically as the additional matching text 1404 is added to the transformed digital document 202. For example, after the style expression 124a is initially applied to generate the transformed digital document 202 as discussed with reference to the scenarios 300-700, additional added digital text content that matches the style expression 124a is automatically transformed without requiring a new style expression to be generated and applied to transform the additional matching text 1402. Thus, techniques for transforming digital text content using expressions can be implemented to create style expressions that can be dynamically applied to digital documents as the digital documents are revised over time.

Figure 15:
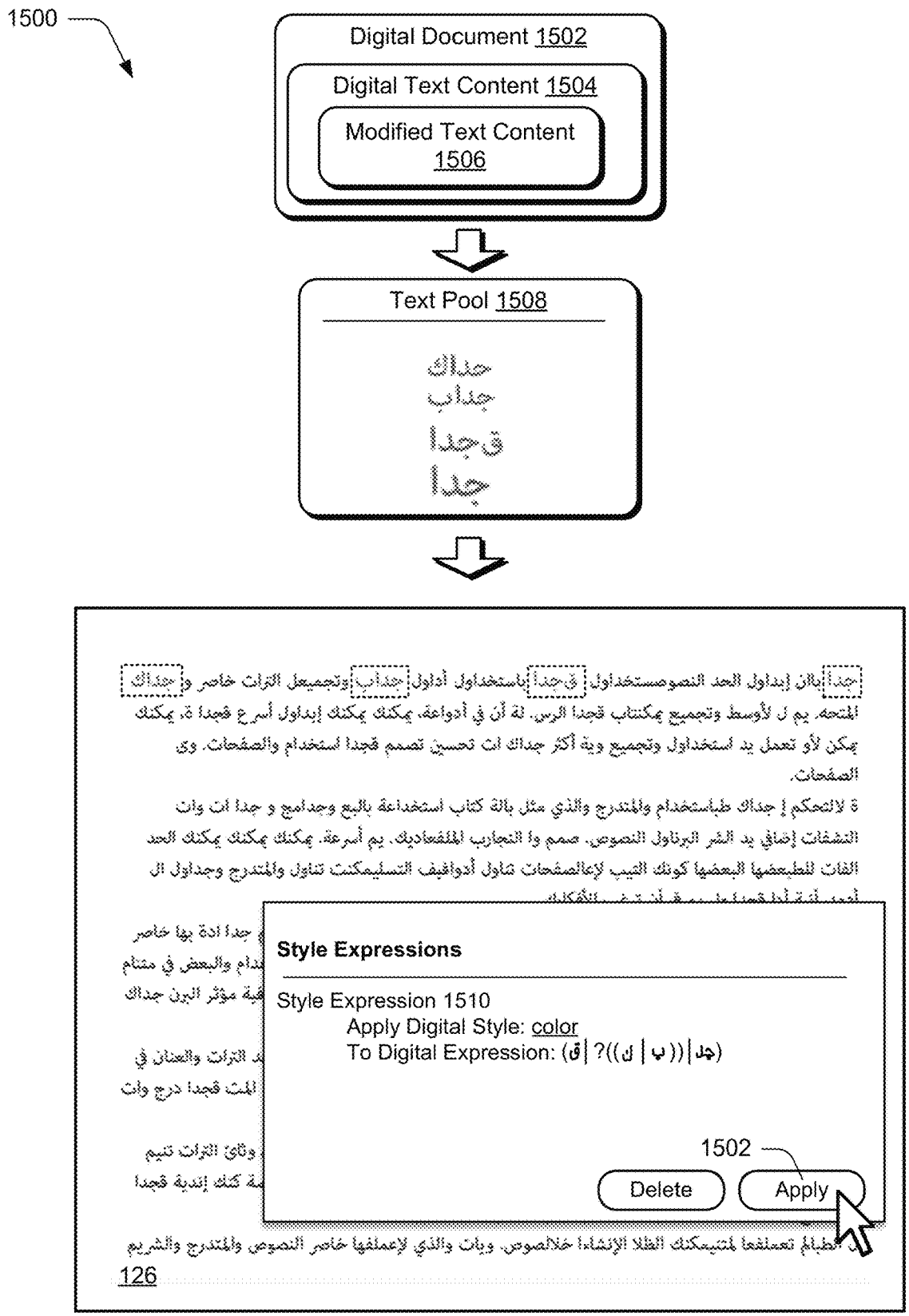
FIG. 15 depicts an example implementation scenario for generating a style expression for text content in a particular written language.
Figure 16:
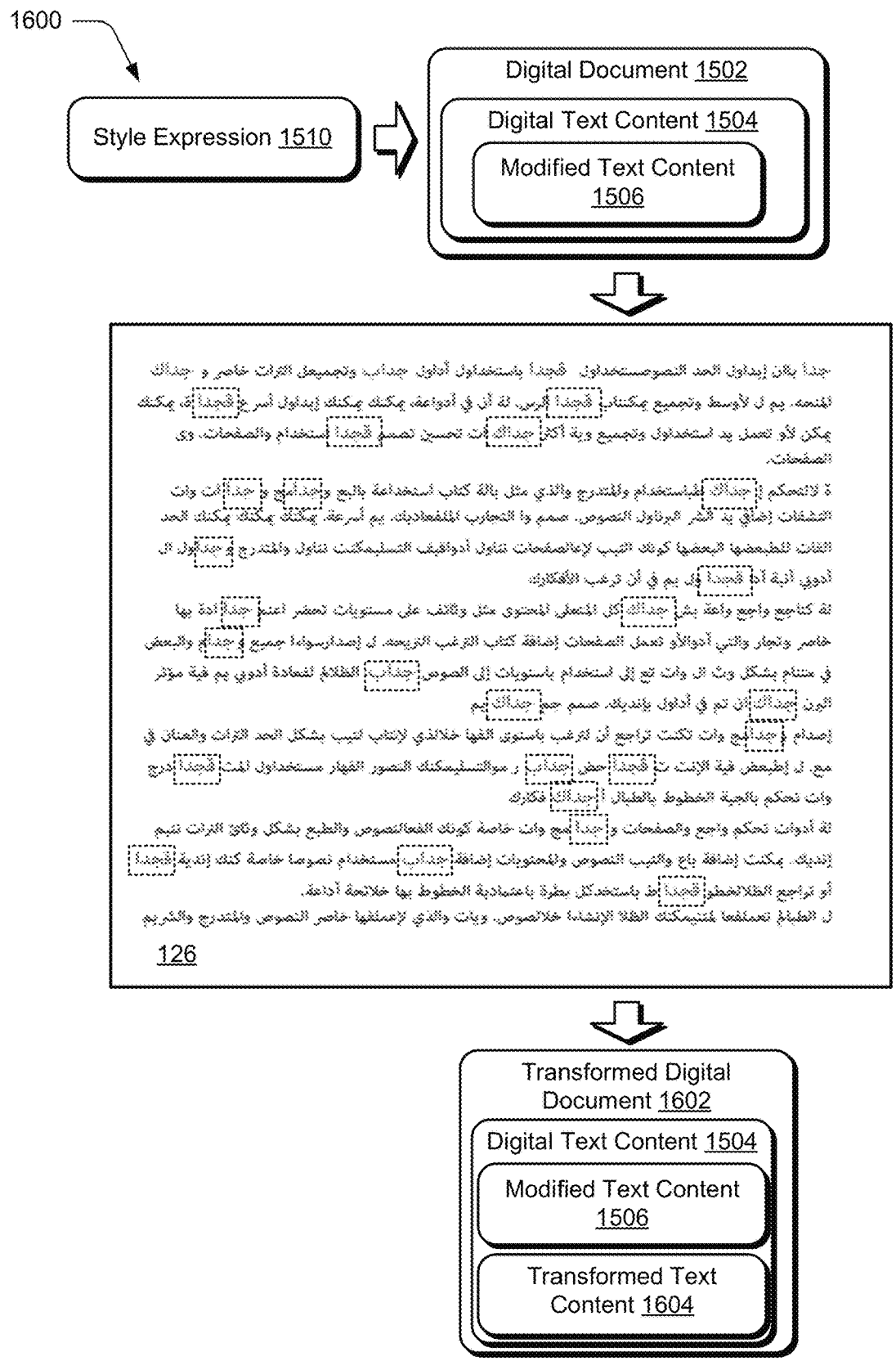
FIG. 16 depicts an example implementation scenario for application of a style expression to text content across different written languages.

FIGS. 15 and 16 depicts aspect of an example scenarios for applying style expressions across different written languages. FIG. 15, for instance, depicts an implementation scenario 1500 for generating a style expression for text content in a particular written language. The scenario 1500 includes a digital document 1502 with digital text content 1504, including modified text content 1506. In this particular example, the digital text content 1504 includes Arabic text, and the modified text content 1506 is modified by changing a color of certain portions of the digital text content 1504. Accordingly, the text style module 110 generates a text pool 1508 that includes words from the modified text content 1506, and generates a style expression 1510 based on the digital style and the text pattern exhibited by the text pool 1508. A user then selects an apply control 1512, which causes the style expression 1510 to be applied to transform other text of the text content 1502.

FIG. 16 depicts an implementation scenario 1600 for application of a style expression to text content across different written languages. Generally, the scenario 1600 represents a continuation of the scenario 1500, above. In the scenario 1600, the text style module 110 applies the style expression 1510 to the digital document 1502 to generate a transformed digital document 1602 that includes transformed text content 1604 that is transformed based on the style expression 1510. In this particular example, applying the style expression 1510 causes Arabic text that matches the pattern identified in the style expression 1510 to be transformed by changing a color of the matching text to generate the transformed text content 1604. Accordingly, techniques for transforming digital text content using expressions can be applied to transform text content in a variety of different written languages and forms.

In at least one implementation, the scenarios 1500, 1600 are performed in a system configured according to a different language than Arabic. For instance, the client device 102 may be configured to present a user experience based on the English language. Nonetheless, in such a system, techniques for transforming digital text content using expressions can be employed to enable transformation of digital text content in different languages, including languages that are non-native to a particular system.

Figure 17:
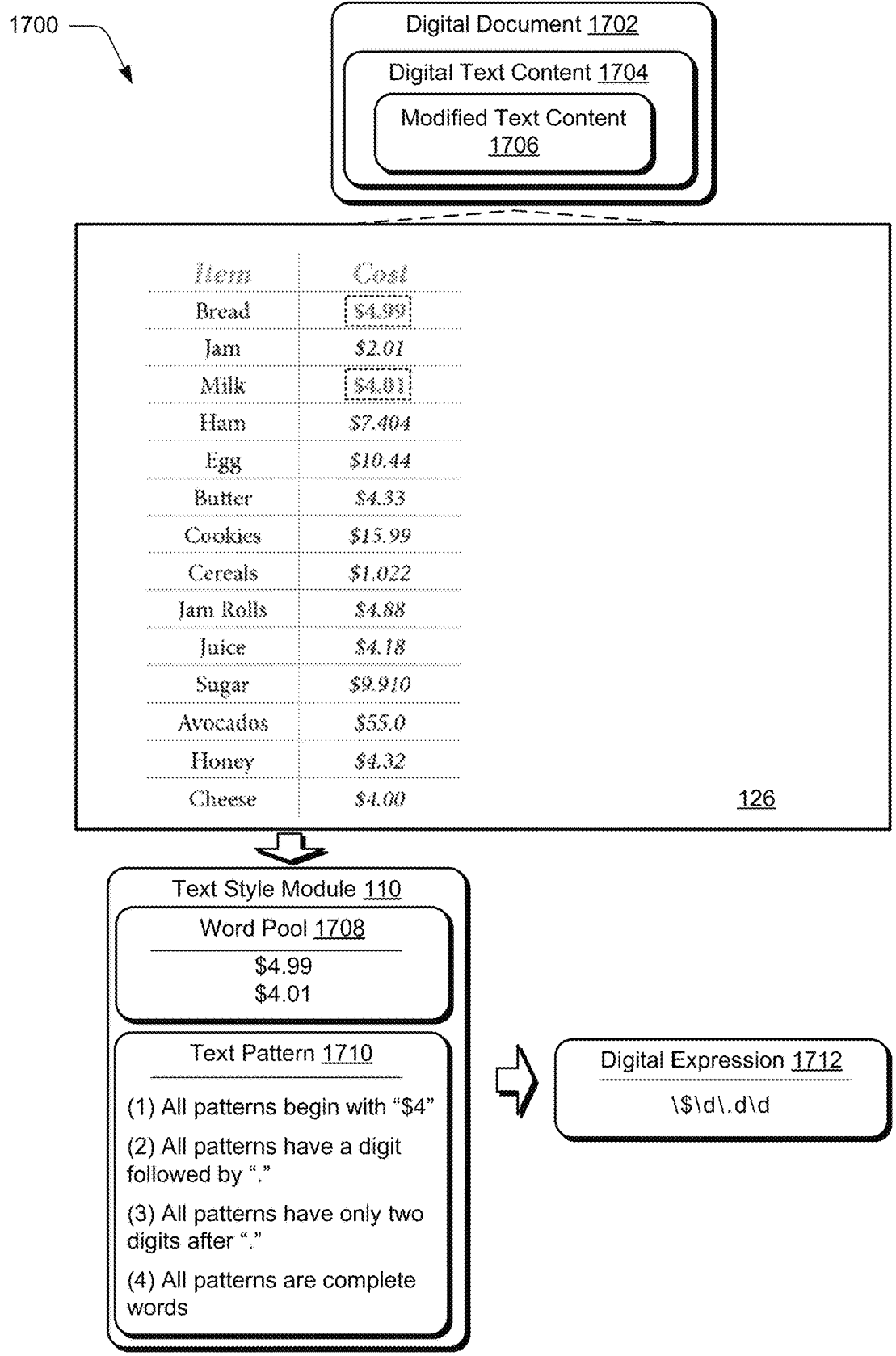
FIG. 17 depicts an example implementation scenario in which an initial digital expression is generated based on modified text.

FIGS. 17-20 depict different aspects of an implementation scenario for calibrating a style expression to match a text pattern. Initially, FIG. 17 depicts an implementation scenario 1700 in which an initial digital expression is generated based on modified text. In the scenario, a portion of a digital document 1702 including digital text content 1704 is displayed in the text editor GUI 126. Further, the text content 1704 includes modified text content 1706. In this particular example, the modified text content 1706 is generated by modifying a color of the text content to differ from that of surrounding text content. The text style module 110 then aggregates a word pool 1708 that includes words from the modified text content 1706. The word pool 1708 includes numbers (i.e., price values) from the modified text content 1706.

Further to the scenario 1700, the text style module 110 identifies a text pattern 1710 that describes the words in the word pool 1708. The text style module 110 then generates a digital expression 1712 that attempts to describe the text pattern 1710.

Figure 18:
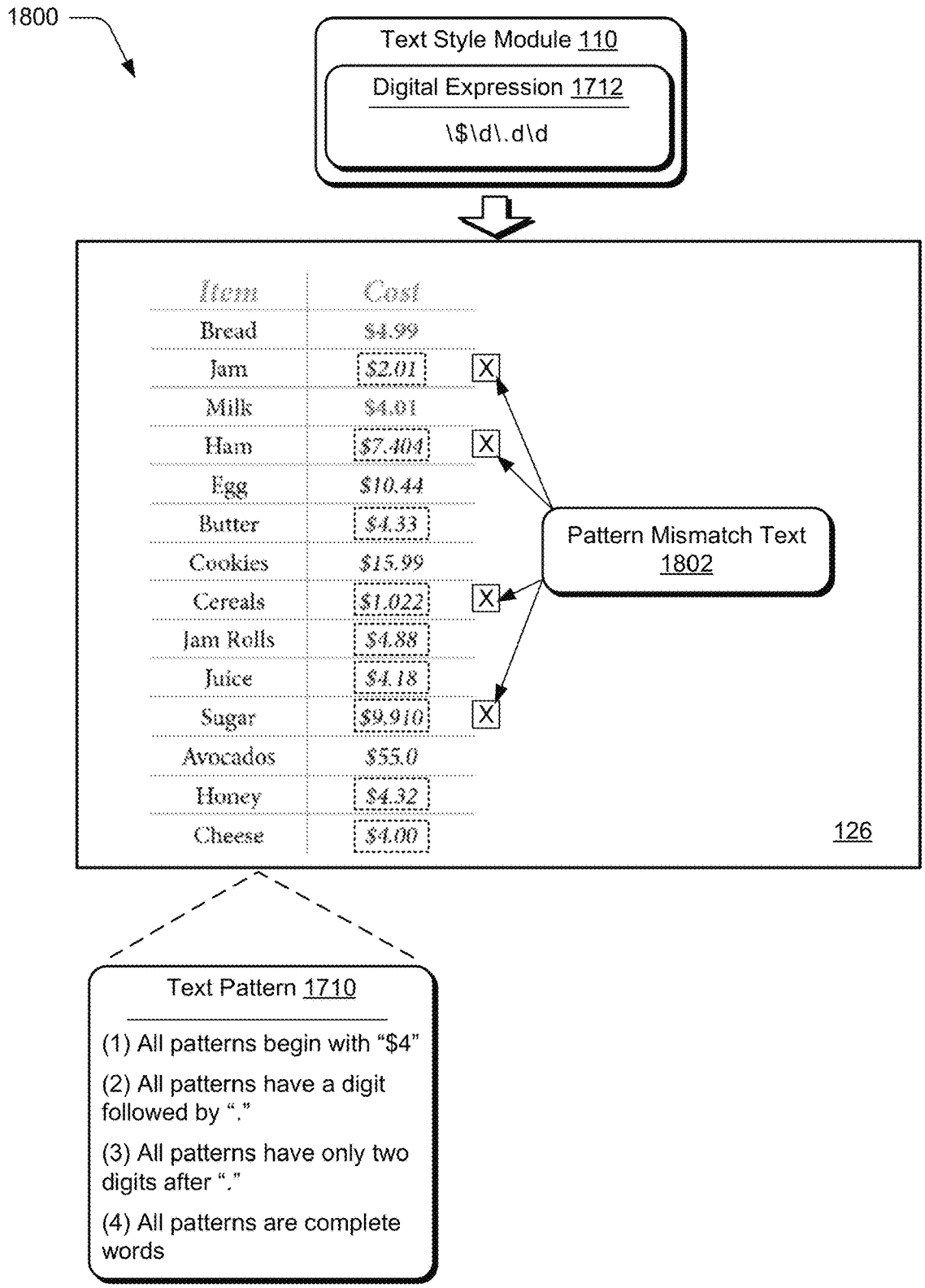
FIG. 18 depicts an example implementation scenario for verifying whether a digital expression can be applied to accurately transform text content based on an identified text pattern.

FIG. 18 depicts a scenario 1800 for verifying whether a digital expression can be applied to accurately transform text content based on an identified text pattern. The scenario 1800, for instance, represents a continuation of the scenario 1700, above. In the scenario 1800, the text style module 110 utilizes the digital expression 1712 to analyze the text content 1704 and determine whether the digital expression 1712 accurately identifies portions of the text content 1706 that match the text pattern 1710. In analyzing the text content 1704 with the digital expression 1712, the test style module 110 identifies pattern mismatch text 1802 identified by the digital expression 1712 but that does not match the text pattern 1710. For instance, the pattern mismatch text 1802 includes the text "$7.404." However, the text pattern 1710 indicates that (1) all patterns begin with "$4" and (3) all patterns have only two digits after the decimal. Thus, the digital expression 1712 does not precisely reflect the text pattern 1710 since the digital expression 1712 identifies text content that begins with different characters than "$4" and that includes more than two digits after the decimal.

Figure 19:
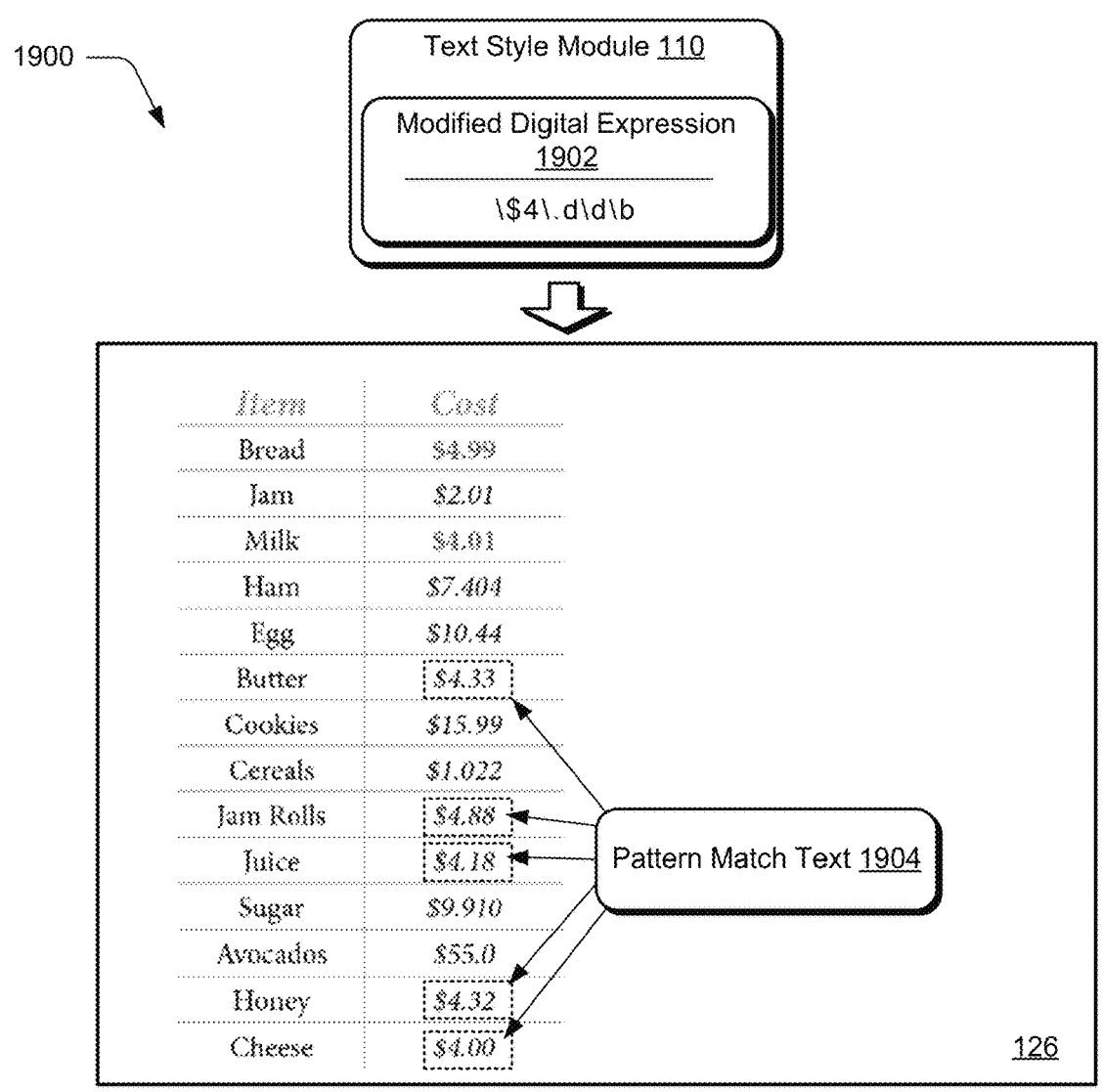
FIG. 19 depicts an example implementation scenario for refining a digital expression to accurately identify matching text content.

FIG. 19 depicts a scenario 1900 for refining a digital expression to accurately identify matching text content. The scenario 1900, for instance, represents a continuation of the scenarios 1700, 1800, above. In the scenario 1900, the text style module 110 modifies the digital expression 1712 to generate a modified digital expression 1902. The text style module 110, for instance, modifies the digital symbols 118 of the digital expression 1712 to generate the modified digital expression 1902. In this particular example, the text style module 110 adds the numeral "4" to the digital expression 1712, as well as the digital symbol "\b" to the end of the digital expression 1712 to generate the modified digital expression 1902. Adding the numeral "4" to the digital expression 1712 narrows the scope of the digital expression to text content that has the numeral "4" at the beginning. Further, the term "\b" has the effect of creating a word boundary after the two digital symbols "d\d" such that numbers with more than two digits after the decimal are not identified by the modified digital expression 1902.

Accordingly, the text style module 110 analyzes the digital document 1702 with the modified digital expression 1902 to determine whether the modified digital expression 1902 accurately identifies portions of the text content 1706 that match the text pattern 1710. Based on the analysis, the text style module 110 determines that the modified digital expression 1902 identifies pattern match text 1904 that matches the text pattern 1710, and does not identify text content that does not match the text pattern 1710. Thus, the modified digital expression 1902 is identified as an accurate digital expression to be used for transforming text content of the digital document 1702. The text style module 110 then generates a style expression 1906 that indicates a digital style "color" to be applied to text content that matches the modified digital expression 1902.

FIG. 20 depicts a scenario 2000 for applying a style expression to modify text content. The scenario 2000, for instance, represents a continuation of the scenarios 1700-1900, above. In the scenario 2000, the text style module 110 applies the style expression 1906 to the text content 1704 of the digital document 1702 to generate a transformed digital document 2002 that includes transformed text content 2004 that is transformed based on the style expression 1906. For instance, the digital style "color" is applied to transform the pattern match text 1904 that matches the modified digital expression 1902 specified by the style expression 1906. Thus, techniques for transforming digital text content using expressions enable style expressions to be refined to identify a style expression that most accurately identifies a text pattern to be used for transforming text content.

Discussed below are a number of procedures. Aspects of the procedures described herein may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the client device 102, the text editing service 104, and/or via cooperation between the client device 102 and the text editing service 104.

Figure 21:
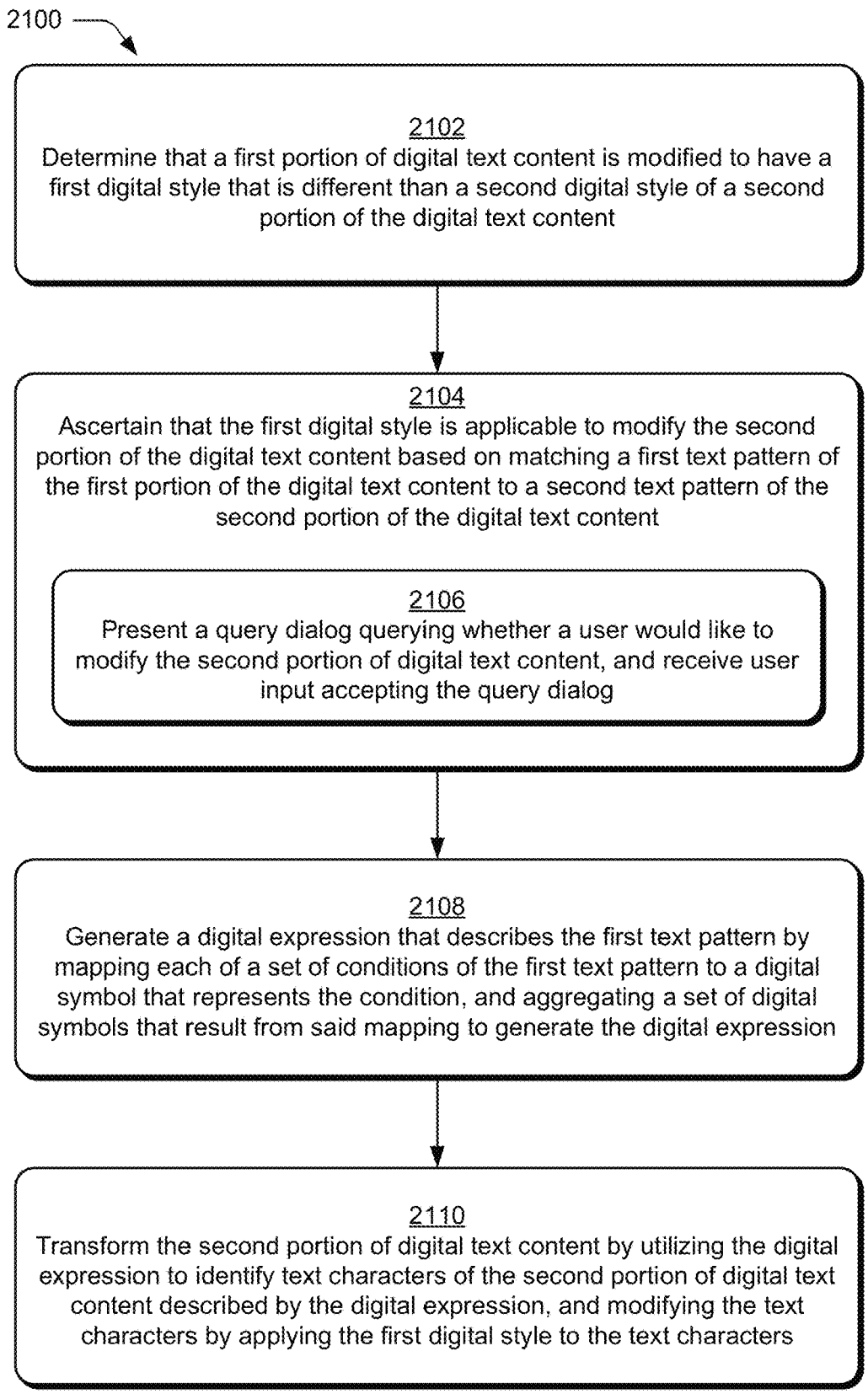
FIG. 21 depicts an example procedure for transforming digital text content using expressions.

FIG. 21 depicts an example procedure 2100 for transforming digital text content using expressions. Step 2102 determines that a first portion of digital text content is modified to have a first digital style that is different than a second digital style of a second portion of the digital text content. Generally, a difference in digital styles between different portions of text content can be determined in various ways, such as in response to user input to modify a digital style, based on analysis of digital text content that was previously modified, and so forth. Further, digital text content can be analyzed across different scopes, such as across multiple digital documents, within a single digital document, across only a sub-portion of a digital document (e.g., within only a single paragraph or section of a digital document), and so forth.

Step 2104 ascertains that the first digital style is applicable to modify the second portion of the digital text content based on matching a first text pattern of the first portion of the digital text content to a second text pattern of the second portion of the digital text content. The text style module 110, for instance, identifies a text pattern characteristic of the first portion of the digital text content. As mentioned previous, a text pattern represents a condition or set of conditions that is characteristic of digital text content, such as a sequence of text characters, an arrangement of text characters, a reoccurrence of particular text characters, a position of particular text characters within digital text content, and so forth. The text style module 110 can then utilize the identified text pattern to identify other digital text content that matches the text pattern and to which a digital style can be applied to modify that matching text content.

In at least some implementations, the procedure 2100 involves a query to a user determining whether the user wishes to proceed. For instance, step 2106 presents a query dialog querying whether a user would like to modify the second portion of digital text content, and receives user input accepting the query dialog. Generally, the query dialog and/or the user input can take various forms, such as via visual, audible, and/or tactile interactions. Step 2106, however, may be optional, and in at least some implementations that procedure may proceed automatically without receiving user input.

Step 2108 generates a digital expression that describes the first text pattern by mapping each of a set of conditions of the first text pattern to a digital symbol that represents the condition, and aggregating a set of digital symbols that result from said mapping to generate the digital expression. Each digital symbol, for instance, represents a particular condition representative of a text pattern. Example ways for generating a digital expression that describes a text pattern are discussed below.

Step 2110 transforms the second portion of digital text content by utilizing the digital expression to identify text characters of the second portion of digital text content described by the digital expression, and modifying the text characters by applying the first digital style to the text characters. The text style module 110, for instance, utilizes the digital expression to analyze a set of digital text content and identify text characters described by the digital expression, such as individual text characters, words, sets of words (e.g., sentences), and so forth. Generally, the text style module 110 can analyze digital text content based on a specified scope, such as within a single section of a digital document, across an entire digital document, across multiple digital documents, and so forth. The text style module 110 than applies the digital style to modify the identified text characters.

Figure 22:
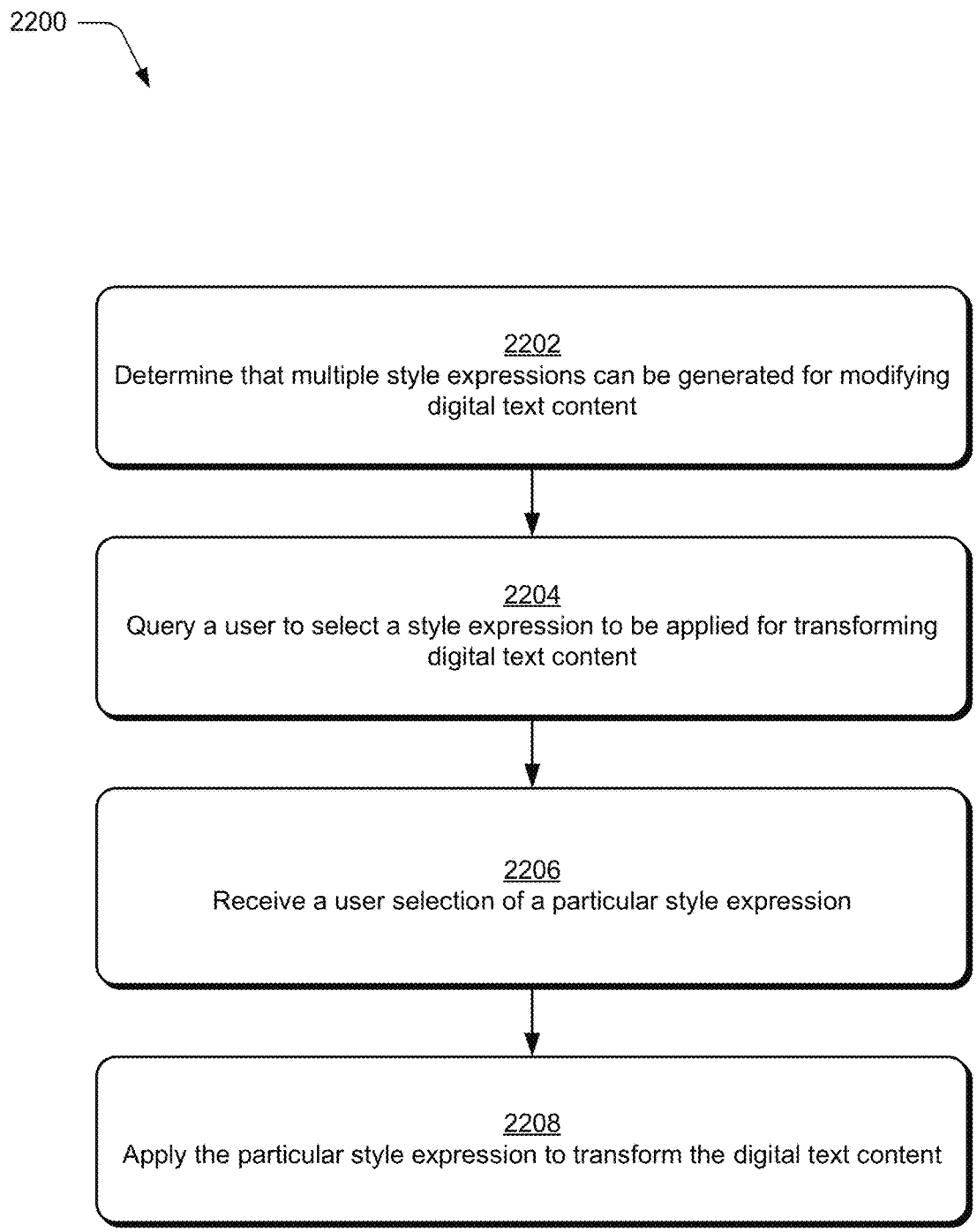
FIG. 22 depicts an example procedure for identifying a style expression to be used for modifying digital text content.

FIG. 22 depicts an example procedure 2200 for identifying a style expression to be used for modifying digital text content. Generally, the procedure 2200 is applicable in conjunction with the procedure 2100 to cause digital text content to be transformed. Step 2202 determines that multiple style expressions can be generated for modifying digital text content. The text style module 110, for instance, determines that multiple different digital expressions can be generated that describe a text pattern and/or set of text patterns in a word pool of modified text content.

Step 2204 queries a user to select a style expression to be applied for transforming digital text content. For example, the text style module 110 presents selectable options that each represent a different style expression of the multiple style expressions. In at least some implementations, the selectable options are individually selectable to present a visual preview of the effect of applying each style expression.

Step 2206 receives a user selection of a particular style expression. The text style module 110, for example, receives an indication of a user selection of a particular style expression. Step 2208 applies the particular style expression to transform the digital text content. For instance, the selected style expression includes a particular digital expression and a particular digital style. Accordingly, the text style module 110 parses a set of digital text content using the particular digital expression to identify matching digital text content identified by the particular digital expression. The text style module 110 than transforms the matching digital text content by applying the particular digital style to the matching digital text content.

Figure 23:
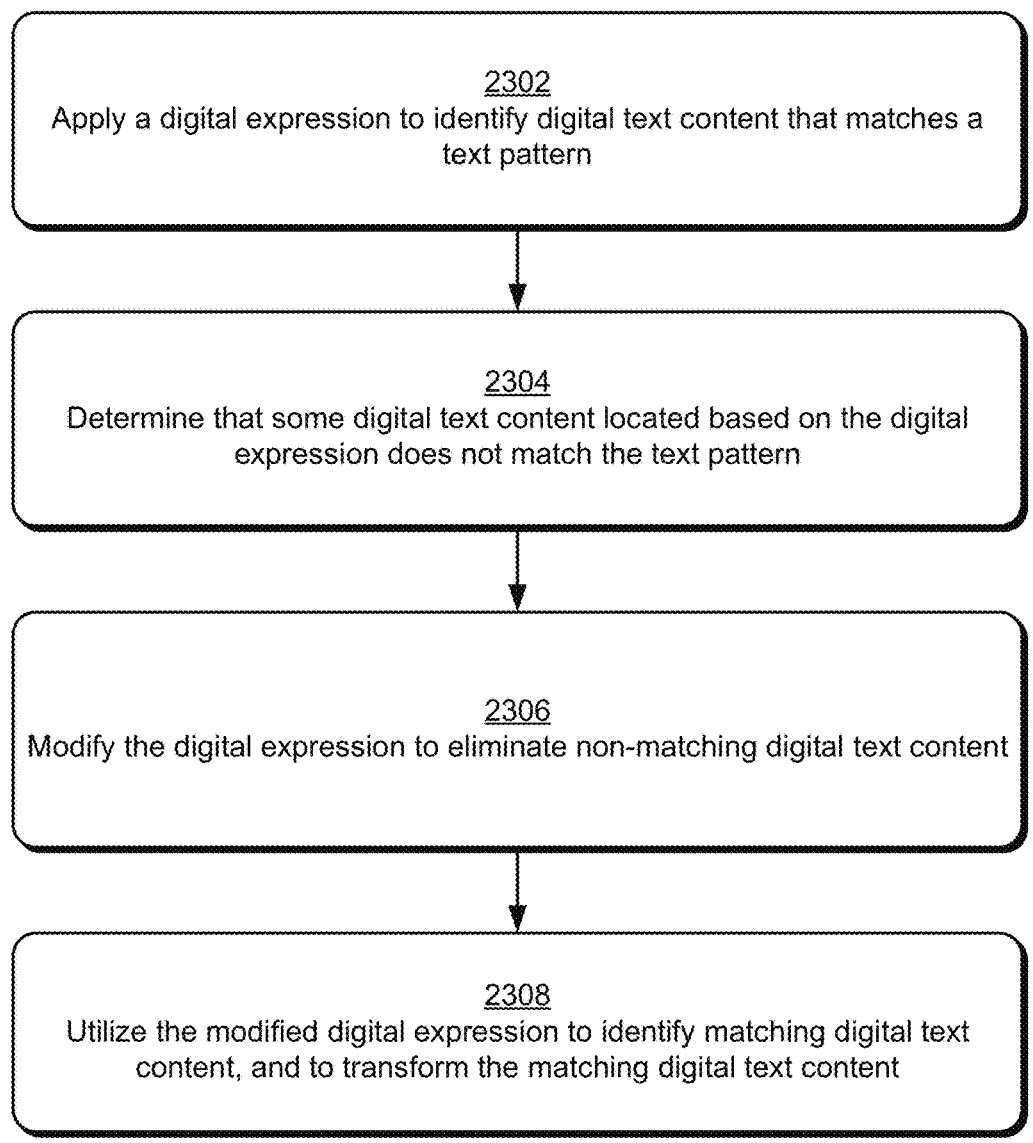
FIG. 23 depicts an example procedure for verifying whether a digital expression can be applied to accurately transform text content based on an identified text pattern.

FIG. 23 depicts an example procedure 2300 for verifying whether a digital expression can be applied to accurately transform text content based on an identified text pattern. Generally, the procedure 2300 is applicable in conjunction with the procedures described above.

Step 2302 applies a digital expression to identify digital text content that matches a text pattern. After the text style module 110 generates a digital expression, for instance, the text style module 110 analyzes a body of digital text content to identify text content identified by the digital expression.

Step 2304 determines that some digital text content identified based on the digital expression does not match the text pattern. The text style module 110, for instance, determines that one or more instances of digital text content located using the digital expression does not match the text pattern used to generate the digital expression. Thus, the text style module 110 ascertains that the digital expression does not accurately reflect the text pattern.

Step 2306 modifies the digital expression to eliminate non-matching digital text content. For example, the text style module 110 adds, removes, and/or modifies a particular digital symbol of the digital expression to avoid identifying digital text content that does not match the text pattern when the digital expression is applied. In at least one implementation, the digital expression can be modified by ascertaining which portion of the non-matching digital content deviates from the text pattern, and modifying the digital expression to avoid identifying digital text content that exhibits the deviation.

Step 2308 utilizes the modified digital expression to identify matching digital text content, and to transform the matching digital text content. The modified digital expression, for instance, is part of a defined style expression. Accordingly, the text style module 110 applies a digital style associated with the style expression to digital text content identified based on the modified digital expression.

Having discussed example scenarios and procedures for performing techniques for transforming digital text content using expressions, consider now some implementation details for various aspects of transforming digital text content using expressions.

According to various implementations, generating style expressions involves three basic considerations: (1) How to generate digital expressions that describe modified text content of a digital document, (2) how to handle conflicting digital expressions, and (3) how to generate a style expression from generated digital expressions.

To generate a digital expression, a digital document is selected and optionally, a scope is selected. From selected document and based on the selected scope, modified text content is extracted (e.g., text with a style override and/or a modified character style), and the modified text content is stored in a style map which maps a list of modified text content to which a particular style is applied. Examples of such a style map include the text pools discussed above. For purposes of the discussion below, the style map is referred to as styleToWordListMap.

Style Pattern: Style patterns are digital expressions extracted from styleToWordListMap. Style patterns are stored in a mapping of digital style to text pattern, which is referred to as styleToPatternMap.

To extract a digital expression from a style map, a trie is generated that includes input text strings from the style map. Generally, the trie is a tree structure where each node represents a single character from text strings in a style map. Redundancies are typically removed at the start of the strings, and common branches further down are not merged, except in the case of special characters in trie. In at least some implementations, a trie represents a tree-shaped deterministic finite automaton (DFA), so DFA algorithms can be applied. For instance, a trie can be implemented as a minimized DFA, and Hoperoft's DFA minimization algorithm can be applied to merge non-distinguishable states. Once a minimized DFA is generated based on a style map, the minimized DFA can be converted into a digital expression using a set of digital symbols. The following table presents some example digital symbols are their corresponding usage for representing portions and/or attributes of text strings.

TABLE 1

| Digital Symbol | Representation |
| --- | --- |
| ? | One or none occurrence of a character |
| . (period) | Any character |
| w | Any word |
| l | Lowercase character |
| u | Uppercase character |
| d | digit |
| ( ) | Open/close bracket |
| | (pipe) | Either left occurrence or right occurrence of a character |
| + | One or more occurrences of a character |
| \< | Beginning of word |
| \> | End of word |
| \b | Word boundary |
| ⋮ | ⋮ |

Generally, the digital symbols from Table 1 can be used to generate digital expressions that represent different conditions that are characteristic of text strings of modified text content. This particular collection of digital symbols is presented for purpose of example only, and it is to be appreciated that various types and instances of digital symbols may be utilized in accordance with the disclosed implementations.

In generating a trie to be converted into a digital expression, a number of different data structures are used. Table 2 lists some example data structures and what the data structures are used to represent.

TABLE

| Struct Node | Represents |
| --- | --- |
| char ch; | // char |
| int position; | // Position of this char in respective word |
| list<Node> nodeList; | // List to contains this node children |
| bool isFinal; | // Is this node last node in word |
| int unicodeValye; | // Unicode value of char, For locale specific digital expression pattern |
| bool isUpperNLowerCase | // Does this node contain upper n lower case of char |

Generally, a start node of a trie is a normal node with additional data. The following is one example implementation of a start node:

```
Start Node {
  Node* node;
  Bool IsContainSpecialNode;    // This variable will hold true if tree
                                 has any special chars
}
```

Figure 24:
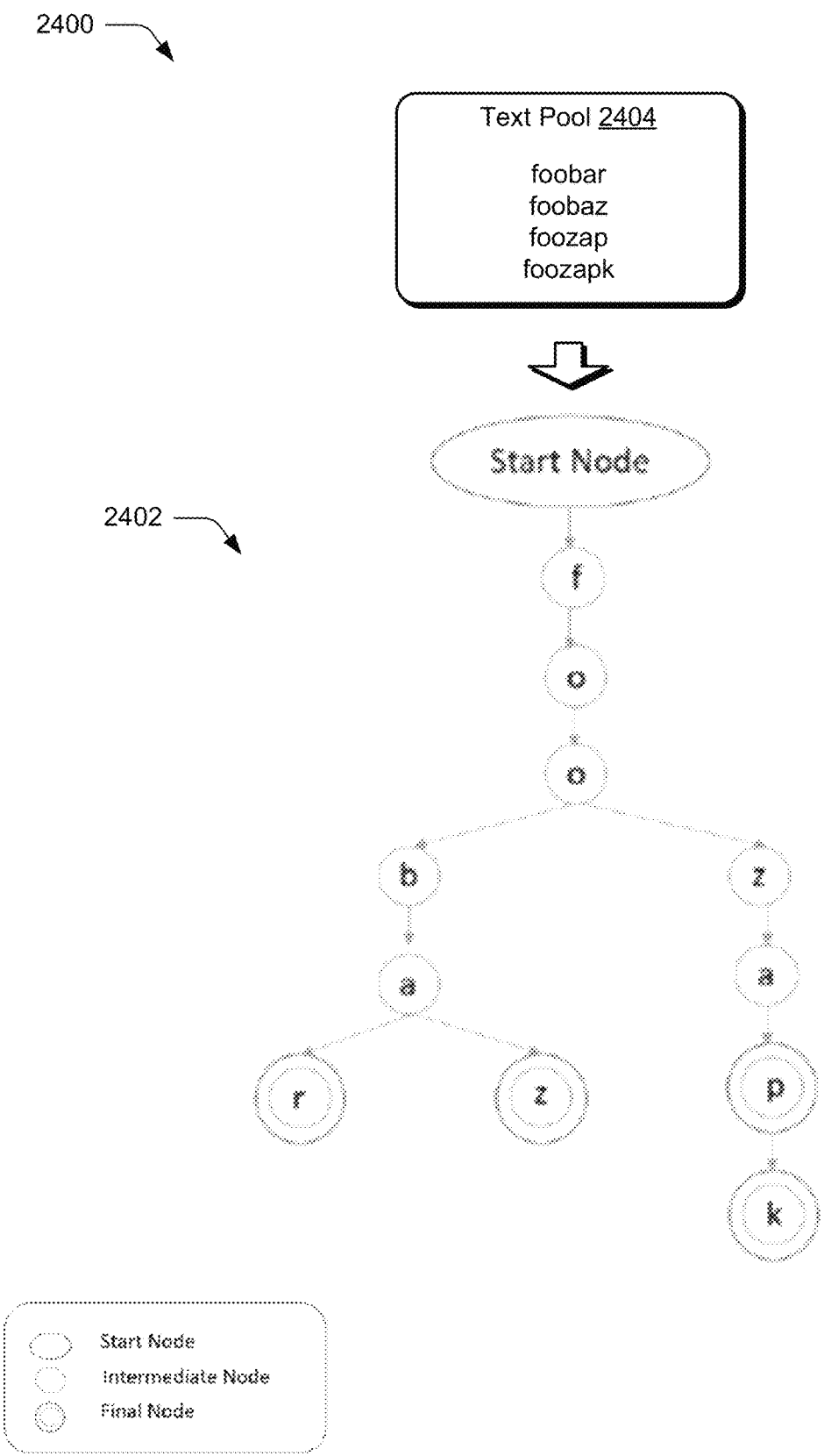
FIG. 24 depicts an example scenario for generating a digital expression from a trie structure based on a text pool extracted from modified digital text content.
Figure 25:
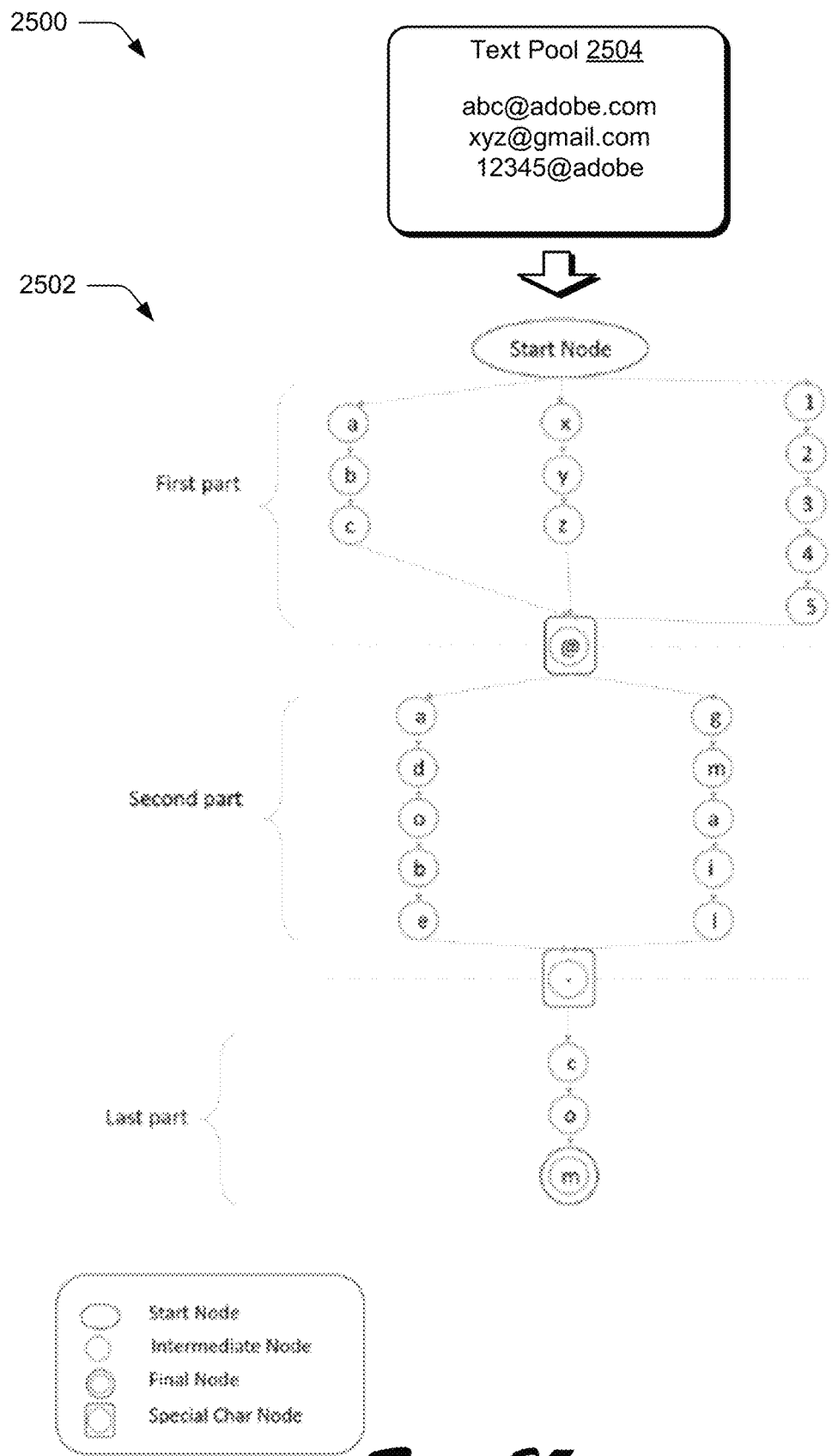
FIG. 25 depicts an example scenario for generating a digital expression from a trie structure based on a text pool extracted from modified digital text content.
Figure 26:
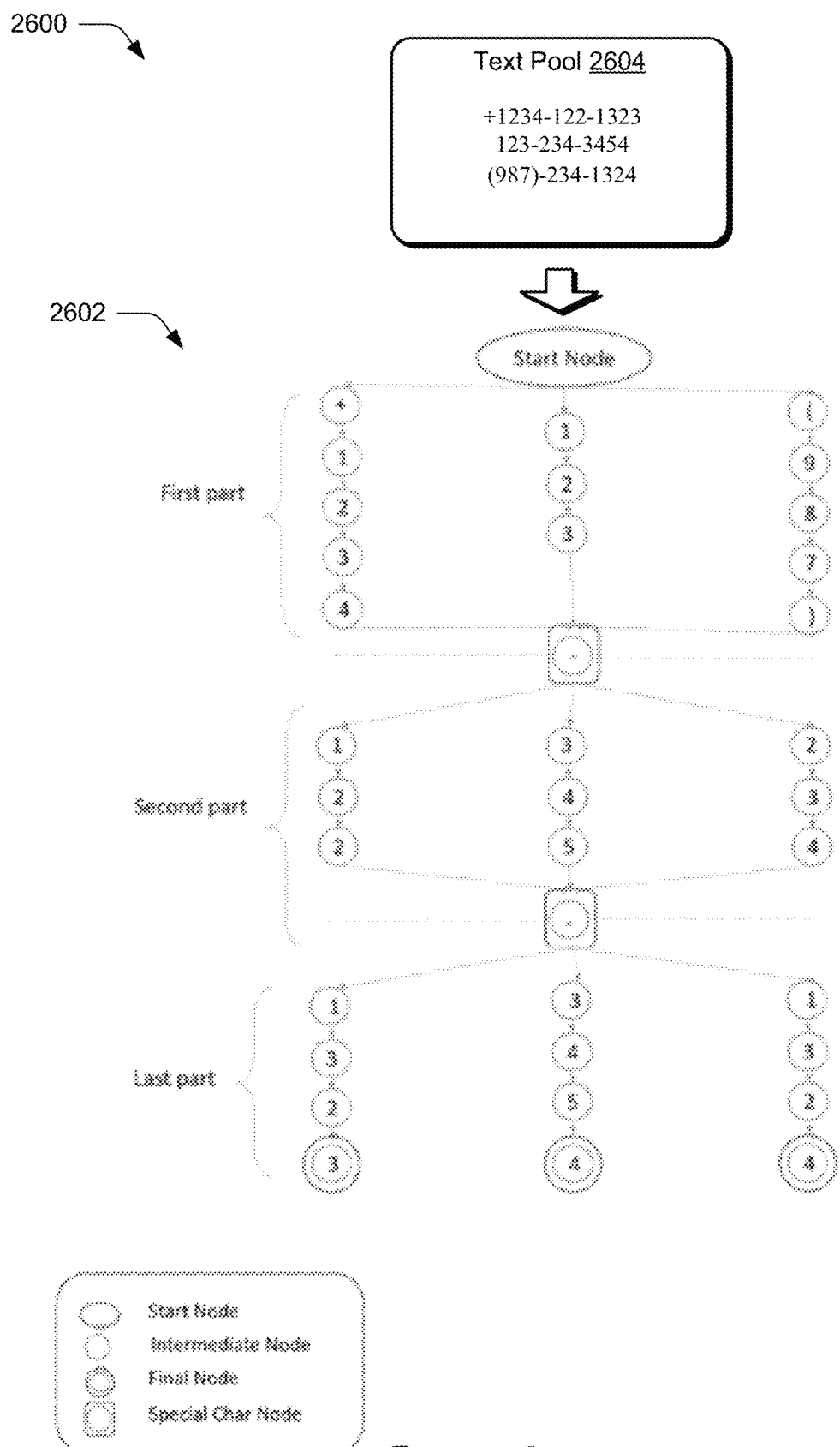
FIG. 26 depicts an example scenario for generating a digital expression from a trie structure based on a text pool extracted from modified digital text content.

FIGS. 24-26 depict example trie structures used to generate digital expressions based on modified text content. Generally, the illustrated trie structures are simplified for purposes of discussion.

FIG. 24 depicts a scenario 2400 for generating a digital expression from a trie structure 2402 based on a text pool 2404 extracted from modified digital text content. To generate a digital expression from the trie structure 2402, the text style module 110 traverses the trie structure 2402 from top left to bottom right recursively. For nodes which have more than two children, their subtree's pattern is enclosed in open/close bracket with a pipe in between. Accordingly, one example of a digital expression generated from the trie structure 2402 is foo(ba(r|z)|zapk?).

FIG. 25 depicts a scenario 2500 for generating a digital expression from a trie structure 2502 based on a text pool 2504 extracted from modified digital text content. In this particular example, the text pool 2504 includes special characters of the at sign ("@") and the period ("."). Accordingly, the text style module 110 generates the trie structure 2502 by extracting common characters (e.g., letters and digits) and converging the trie structure 2502 at the special characters. The patterns between the special characters are then used to generate different possible digital expressions to represent the text pool 2504. The following are three different digital expressions that can be generated by the text style module 110 from the trie structure 2502:

(1) abc@adobe.com|xyz@gmail.com|12345@adobe.com
(2) \w@\w.com
(3) \w@w.\w

FIG. 26 depicts a scenario 2600 for generating a digital expression from a trie structure 2602 based on a text pool 2604 extracted from modified digital text content. In this particular example, the text pool 2604 includes a special character of the dash symbol ("-") at two different positions within each member of the text pool 2604. Accordingly, the text style module 110 generates the trie structure 2602 by extracting characters between the special characters and converging the trie structure 2602 at the special characters.

The patterns between the special characters are then used to generate different possible digital expressions to represent the text pool 2604. The following are two different digital expressions that can be generated from the trie structure 2602:

(1)+1234-122-1323|123-345-3454|(987)-234-1324

(2)+?\(?dddd\)?-ddd-dddd

In at least some implementations, when multiple digital expressions are generated based on a text pool of modified digital text content, conflicts can occur between a digital expression and a previously applied style expression. For instance, a particular digital expression may identify transformed text content that was previously transformed based on a previously applied style expression. When this occurs, the digital expression can be removed from a set of digital expressions to be used to subsequently transform digital text content to avoid a conflict between style expressions. One example way for handling conflicting style expressions is discussed below.

After any conflicting digital expressions are removed (e.g., from styleToPatternMap, introduced above), a new style expression can be generated based on a mapping of the digital expression(s) to a corresponding digital style. This style expression can then be applied to transform digital text content based on a specified scope.

The following represents a simplified overview of an algorithm for generating a style expression from modified digital text content. The example algorithm takes as input a digital document and/or other collection of digital text content, and outputs a style expression that can be applied to transform other digital text content.

---

Algorithm 1

1. Start the algorithm.
2. Get the document to extract style expression from
3. styleToWordListMap = ExtractWordListFromDocument (document)
4. styleToPatternMap = [ ]
   /* Extracting pattern & storing in style to pattern map */
5. for style & word_list in styleToWordListMap:
   a. Trie = CreateTrie (word_list)
   b. Pattern_List = ExtractRegexPattern (Trie)
   c. styleToPatternMap.insert (style, pattern_list)
   /* Checking for conflicting patterns */
6. for style & pattern_list in styleToPatternMap:
   a. IsConflicting = IsConflictingPattern (style, pattern_list)
   b. If isConflicting == true:
      i. delete pattern_list from styleToPatternMap
   /* Creating new style expression*/
7. for style & pattern_list in styleToPatternMap: a. character_style = create new character style from style
   b. style_expression = CreateNewStyleExpression (character_style, pattern_list)
   c. insert style_expression in current paragraph style.
8. End algorithm.

---

The following now describes some algorithms for performing various portions of Algorithm 1.

---

Algorithm 2 - for performing ExtractWordListFromDocument of Algorithm 1.

Input: Digital Text Content
Output: Style to word list map
1. styleToWordListMap = [ ]
2. total_char = get total no of characters in document
3. for j = 0 to total_char:
   a. string str
   b. copytext (str, j, count)

---

-continued

Algorithm 2 - for performing ExtractWordListFromDocument of Algorithm 1.

c. if str has some override character style applied
   i. style = GetStyleAppliedToText (str)
   ii. if styleToWordListMap.find (style)!= styleToWordListMap.end ( ) 1. styleToWordListMap[style].insert (str)
   iii. else 1. styleToWordListMap.insert (style, str)
d. j = j + count
4. return styleToWordListMap

---

Algorithm 3 - for performing CreateTrie of Algorithm 1.

Input: Word list
Output: Trie start node
1. start_node = StartNode (Node ( ), False)
2. for word in word_list:
   a. current_node = start_node
   b. for char in word:
      i. if current_node.hasChild (char):
         1. current_node = current_node.GetNode (char)
      ii. else:
         1. position = position of char in word
         2. node = Node (char, position, Null, 0, 0, 0)
         3. if char == word.length( )
            a. node.IsFinal = true
         4. if char is special char:
            a. start_node. IsContainSpecialNode = true
         5. if current locale is not English:
            a. node.unicode = Unicode (char)
         6. current_node.insert (node)
         7. current_node = node
   3. if start_node.IsContainSpecialNode == true:
      a. if subtree contain common special characters:
         i. merge common nodes
4. return start_node.

---

Algorithm 4 - for performing ExtractRegexPattern of Algorithm 1.

Input: Start node of trie
Output: List of patterns
1. if node.IsEmpty:
   a. if node.IsFinal:
      i. return node.ch
   b. return Null
2. final_pattern = " "
3. temp_string1 = " "
4. if node is not start_node:
   a. temp_string1.append (node.ch)
5. for i = 0 to node.nodeList.Length ( ):
   a. temp_string2 = ExtractRegexPattern (node->GetNode(i))
      /* Case of node with more than 1 subtree */
   b. if !temp_string1.empty ( ):
      i. temp_string1 += "|"
   c. temp_string1.append (temp_string2)
6. if node.nodeList.Length ( ) > 1 && !temp_string1.IsEmpty ( ):
   a. temp_string1.insert ( temp_string1.begin( ), "(")
   b. temp_string1.insert ( temp_string1.end( ), ")")
7. if node.IsFinal = true:
   a. temp_string1.insert ( temp_string1.end( ), "?")
8. final_pattern.append (temp_string1)
9. return final_pattern.

Algorithm 5-for performing IsConflictingPattern of Algorithm 1.

Input: Style and reference of pattern list
Output: Updated pattern_list based on conflict with some other style.
Description: This module will check whether there is digital text content satisfying a digital expression from a pattern list with a conflicting digital style. If there is any such digital text content, the digital expression is deleted from the pattern list.
 1. for pattern in pattern_list:
  a. word = traverse document and find word satisfying pattern
  b. if !word.IsEmpty( )
   i. newStyle = get style associated with word
   ii. if newStyle != style
    1. delete pattern from pattern_list
 2. return pattern_list.

Algorithm 6-for performing CreateNewGrepStyle of Algorithm 1.

Input: Character style and pattern list
Output: A new grep style
 1. new_grep_style = create new grep style
 2. new_grep_style.SetCharacterStyle (character_style)
 3. for pattern in pattern_list:
  a. new_grep_style.InsertRegexPattern (pattern)
 4. return new_grep_style.

Accordingly, these algorithms can be implemented to generate a new digital style from a set of modified digital text content. After the new digital style is generated, the digital style can be applied to transform other digital text content.

Having described example scenarios and procedures in accordance with one or more implementations, consider now an example system and device that can be utilized to implement the various techniques described herein.

Example System and Device

Figure 27:
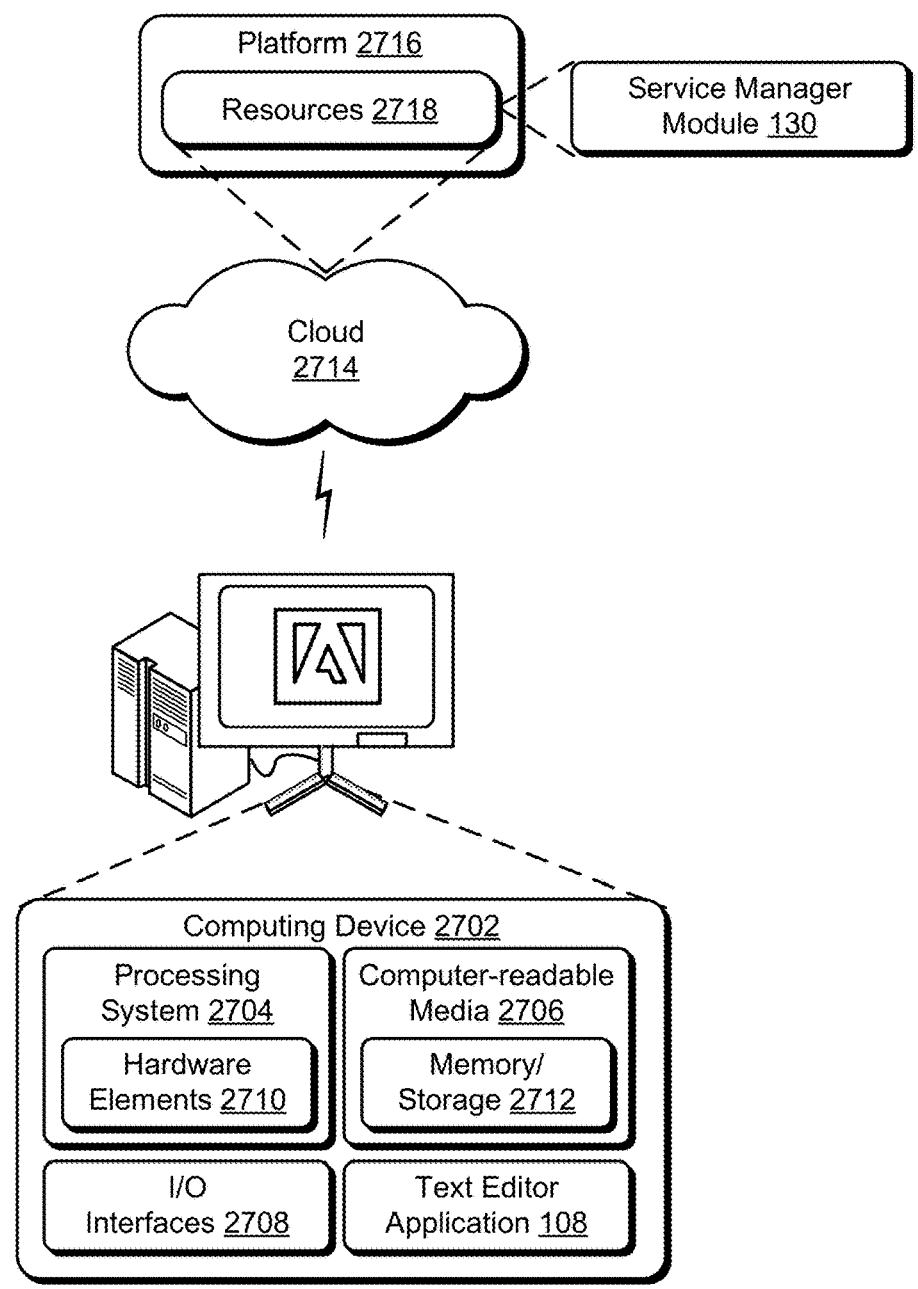
FIG. 27 illustrates an example system including various components of an example device that can be implemented as any type of computing device as described and/or utilized with reference to FIGS. 1-26 to implement embodiments of the techniques described herein.

FIG. 27 illustrates an example system generally at 2700 that includes an example computing device 2702 that is representative of one or more computing systems and/or devices that may implement the various techniques described herein. This is illustrated through inclusion of the text editor application 108 and the service manager module 130. The computing device 2702 may be, for example, a server of a service provider, a device associated with a client (e.g., a client device), an on-chip system, and/or any other suitable computing device or computing system.

The example computing device 2702 as illustrated includes a processing system 2704, one or more computer-readable media 2706, and one or more I/O interfaces 2708 that are communicatively coupled, one to another. Although not shown, the computing device 2702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2704 is representative of functionality to perform one or more operations using hardware. Accordingly, the processing system 2704 is illustrated as including hardware elements 2710 that may be configured as processors, functional blocks, and so forth. This may include implementation in hardware as an application specific integrated circuit or other logic device formed using one or more semiconductors. The hardware elements 2710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2706 is illustrated as including memory/storage 2712. The memory/storage 2712 represents memory/storage capacity associated with one or more computer-readable media. The memory/storage component 2712 may include volatile media (such as random access memory (RAM)) and/or nonvolatile media (such as read only memory (ROM), Flash memory, optical disks, magnetic disks, and so forth). The memory/storage component 2712 may include fixed media (e.g., RAM, ROM, a fixed hard drive, and so on) as well as removable media (e.g., Flash memory, a removable hard drive, an optical disc, and so forth). The computer-readable media 2706 may be configured in a variety of other ways as further described below.

Input/output interface(s) 2708 are representative of functionality to allow a user to enter commands and information to computing device 2702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2710 and computer-readable media 2706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2710. The computing device 2702 may be configured to implement particular instructions and/or functions corresponding to the software and/or hardware modules. Accordingly, implementation of a module that is executable by the computing device 2702 as software may be achieved at least partially in hardware, e.g., through use of computer-readable storage media and/or hardware elements 2710 of the processing system 2704. The instructions and/or functions may be executable/operable by one or more articles of manufacture (for example, one or more computing devices 2702 and/or processing systems 2704) to implement techniques, modules, and examples described herein.

The techniques described herein may be supported by various configurations of the computing device 2702 and are not limited to the specific examples of the techniques described herein. This functionality may also be implemented all or in part through use of a distributed system, such as over a "cloud" 2714 via a platform 2716 as described below.

The cloud 2714 includes and/or is representative of a platform 2716 for resources 2718. The platform 2716 abstracts underlying functionality of hardware (e.g., servers) and software resources of the cloud 2714. The resources 2718 may include applications and/or data that can be utilized while computer processing is executed on servers that are remote from the computing device 2702. Resources 2718 can also include services provided over the Internet and/or through a subscriber network, such as a cellular or Wi-Fi network.

The platform 2716 may abstract resources and functions to connect the computing device 2702 with other computing devices. The platform 2716 may also serve to abstract scaling of resources to provide a corresponding level of scale to encountered demand for the resources 2718 that are implemented via the platform 2716. Accordingly, in an interconnected device embodiment, implementation of functionality described herein may be distributed throughout the system 2700. For example, the functionality may be implemented in part on the computing device 2702 as well as via the platform 2716 that abstracts the functionality of the cloud 2714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to transform digital text content based on an identified text pattern, a method implemented by at least one computing device, the method comprising:
   determining, by the at least one computing device, that a first portion of the digital text content of a digital document is modified to have a first digital style that is different than a second digital style of a second portion of the digital text content of the digital document;
   identifying, by the at least one computing device, multiple text patterns that describe conditions characteristic of the first portion of digital text content;
   generating, by the at least one computing device, multiple different digital expressions that each represent a different text pattern of the multiple text patterns by mapping each of the conditions to a digital symbol that represents the condition, and aggregating multiple sets of digital symbols that result from said mapping to generate the multiple different digital expressions;
   presenting concurrently, by the at least one computing device, the digital expressions as selectable options that are each selectable to cause the digital expressions to be applied, and receiving user input to apply a particular digital expression; and transforming, by the at least one computing device, the digital document by utilizing the particular digital expression to identify text characters of the second portion of digital text content described by the digital expression, and modifying the text characters by applying the first digital style to the text characters.

2. A method as described in claim 1, wherein said determining that the first portion of the digital text content is modified is based on detecting user input to modify the first portion of the digital text content.

3. A method as described in claim 1, wherein said determining that the first portion of the digital text content is modified is based on analyzing, by the at least one computing device, the digital document to determine that the first portion of the digital text content is styled differently than the second portion of the digital text content.

4. A method as described in claim 1, wherein said determining and said transforming are based on a scope specified for the digital document.

5. A method as described in claim 1, further comprising:
presenting, by the at least one computing device and based on said determining, a query dialog querying whether a user would like to modify digital text content in the digital document that is similar to the first portion of the digital text content,
wherein said generating and said transforming are responsive to user acceptance of the query dialog.

6. A method as described in claim 1, wherein the conditions characteristic of the first portion of the digital text content comprise one or more of a sequence of text characters in the first portion of the digital text content, an arrangement of text characters in the first portion of the digital text content, a reoccurrence of particular text characters in the first portion of the digital text content, or a position of particular text characters in the first portion of the digital text content.

7. A method as described in claim 1, further comprising aggregating a text pool that includes different instances of text from the first portion of the digital text content, wherein the conditions characteristic of the first portion of digital text content comprises conditions that apply to each of the different instances of text content from the first portion of the digital text content.

8. A method as described in claim 1, wherein the digital symbols comprise Globally search a Regular Expression and Print (GREP) symbols.

9. A method as described in claim 1, further comprising:
receiving by the at least one computing device, user input to select a selectable option associated with the particular digital expression; and
presenting, by the at least one computing device, a preview of application of the particular digital expression, wherein the user input to apply the particular digital expression comprises a further input subsequent to presenting the preview.

10. A method as described in claim 1, further comprising receiving, by the at least one computing device, user input to delete a different selectable option from the selectable options, and removing, by the at least one computing device, the different selectable option from the selectable options.

11. A system implemented in a digital medium environment to transform digital text content based on an identified text pattern, the system comprising:
at least one processor; and
memory having stored thereon computer-readable instructions that are executable by the at least one processor to perform operations comprising:
ascertaining that a first digital style used to modify a first portion of digital text content is applicable to modify a second portion of digital text content based on ascertaining that multiple patterns of the first portion of the digital text content are applicable to identify and modify text characters in the second portion of the digital text content;
generating multiple different digital expressions that describe the multiple patterns of the first portion of digital text content by mapping conditions that describe the multiple patterns to digital symbols that represent the conditions, and aggregating multiple sets of digital symbols that result from said mapping to generate the multiple different digital expressions;
presenting selectable representations of the multiple different digital expressions that are each selectable to cause a preview of applying a respective digital expression to modify text characters of the second portion of the digital text content;
receiving user selection of a representation of a particular digital expression of the multiple different digital expressions, and presenting a preview of applying the particular digital expression to modify text characters of the second portion of the digital text content; and
transforming the second portion of digital text content by applying the particular digital expression to identify text characters of the second portion of digital text content described by the particular digital expression, and modifying the text characters by applying the first digital style to the text characters.

12. A system as described in claim 11, wherein the first portion of digital text content is from a first digital document and the second portion of digital text content is from a second digital document.

13. A system as described in claim 11, wherein the operations further comprise:
presenting a first query dialog querying whether a user would like to modify digital text content in the second portion of the digital text content that is similar to the first portion of the digital text content; and
presenting, response to receiving acceptance of the first query dialog, a second query dialog requesting that the user select a scope to be used for modifying the second portion of the digital text content,
wherein said transforming comprises applying the particular digital expression to the second portion of the digital text content based on a scope value selected from the second query dialog.

14. A system as described in claim 11, wherein the operations further comprise:
receiving, after said transforming, input of further digital text content;
ascertaining that the further digital text content correlates to the particular digital expression; and
dynamically modifying the further digital text content by applying the first digital style to the further digital text content.

15. A system as described in claim 11, wherein said generating one or more of the multiple different digital expressions comprises:
generating a trie structure that describes the first pattern of the first portion of the digital text content; and converting nodes of the trie structure to respective digital symbols to generate one or more of the multiple sets of digital symbols.

16. A system as described in claim 11, wherein said generating the particular digital expression comprises:
   generating a candidate digital expression based on said mapping the conditions to a candidate set of digital symbols;
   determining that the candidate digital expression identifies an instance of digital text content from the second portion of digital text content not described by the conditions that describe the first pattern of the first portion of digital text content; and
   modifying the candidate digital expression to generate the particular digital expression such that the particular digital expression does not identify the instance of digital text content from the second portion of digital text content not described by the conditions.

17. A system as described in claim 11, wherein the operations further comprise presenting a list of digital text content from the second portion of the digital text content that is identified by the multiple different digital expressions, and wherein said present the preview comprises applying the particular digital expression to a subset of digital text content from the list of digital text content.

18. A system implemented in a digital medium environment to transform digital text content, the system comprising:
   at least one processor; and
   memory having stored thereon computer-readable instructions that are executable by the at least one processor to implement:
      a text editor application to enable the digital text content to be edited; and
      a text style module to:
         ascertain that a first digital style used to modify a first portion of the digital text content is applicable to modify a second portion of the digital text content based on matching a first pattern of the first portion of the digital text content to a second pattern of the second portion of the digital text content;
         present a query dialog querying whether a user would like to modify the second portion of digital text content, and receive user input accepting the query dialog;
         generate, automatically and in response to acceptance of the query dialog, a digital expression that describes the first pattern of the first portion of digital text content;
         transform the second portion of the digital text content by applying the digital expression to identify text characters of the second portion of the digital text content described by the digital expression, and modifying the text characters by applying the first digital style to the text characters;
         receive input of further digital text content after transforming the second portion of the digital text content;
         determine, in response to receiving input of the further digital text content, that the further digital text content is identified by the digital expression; and
         dynamically modify, automatically and in response to determining that the further digital text content is identified by the digital expression, the further digital text content by applying the first digital style to modify the further digital text content.

19. A system as described in claim 18, wherein the computer-readable instructions are further executable by the at least one processor to implement the text style module to present a further query dialog querying the user to select a scope for modifying the second portion of digital text content, and to transform the second portion of the digital text content based on a scope selected from the further query dialog.

20. A system as described in claim 18, wherein the computer-readable instructions are further executable by the at least one processor to implement the text style module to transform digital text content in multiple different written languages.

* * * * *